United States Patent
Sato et al.

(10) Patent No.: US 7,209,857 B2
(45) Date of Patent: Apr. 24, 2007

(54) METHOD OF EVALUATING SHAPE OF SEMICONDUCTOR WAFER AND APPARATUS FOR EVALUATING SHAPE OF SEMICONDUCTOR WAFER

(75) Inventors: Masakazu Sato, Fukushima (JP); Masato Onishi, Fukushima (JP)

(73) Assignee: Shin-Etsu Handotai Co., Ltd., Tokyo (JP)

( * ) Notice: Subject to any disclaimer, the term of this patent is extended or adjusted under 35 U.S.C. 154(b) by 177 days.

(21) Appl. No.: 10/517,655

(22) PCT Filed: Jun. 10, 2003

(86) PCT No.: PCT/JP03/07320

§ 371 (c)(1),
(2), (4) Date: Dec. 13, 2004

(87) PCT Pub. No.: WO03/106925

PCT Pub. Date: Dec. 24, 2003

(65) Prior Publication Data

US 2005/0255610 A1    Nov. 17, 2005

(30) Foreign Application Priority Data

Jun. 13, 2002  (JP)  .............................. 2002-173268

(51) Int. Cl.
*G01B 15/00*  (2006.01)
(52) U.S. Cl. ..................................................... 702/155
(58) Field of Classification Search ................ 702/150, 702/155, 182, 183, 186; 438/14, 16; 700/110, 700/121; 250/307, 310; 356/32
See application file for complete search history.

(56) References Cited

U.S. PATENT DOCUMENTS 6,335,269 B1 *  1/2002  Sato ........................... 438/509

FOREIGN PATENT DOCUMENTS

| JP | A 2-083404 | 3/1990 |
| JP | A 05-141949 | 6/1993 |
| JP | A 06-034362 | 2/1994 |
| JP | A 9-148413 | 6/1997 |
| JP | A 11-287630 | 10/1999 |
| JP | A 2000-146569 | 5/2000 |
| JP | A 2000-292152 | 10/2000 |
| JP | A 2001-41736 | 2/2001 |
| JP | A 2002-039745 | 2/2002 |
| WO | WO 02/41380 A1 | 5/2002 |

* cited by examiner

*Primary Examiner*—Bryan Bui
(74) *Attorney, Agent, or Firm*—Oliff & Berridge, PLC

(57) ABSTRACT

The present invention is a method of evaluating a shape of a semiconductor wafer comprising the steps of: measuring shape data of a semiconductor wafer by scanning a front surface and/or a back surface of the semiconductor wafer; calculating a differential profile through a differential process of the measured shape data; analyzing the obtained differential profile and obtaining a surface characteristic of the wafer, and; evaluating a shape of the semiconductor wafer. Thereby, there are provided a method of evaluating a shape of a semiconductor wafer and an apparatus for evaluating a shape thereof, wherein a shape of a semiconductor wafer, particularly a shape of a peripheral portion of the wafer, can be quantitatively evaluated from a viewpoint different from conventional SFQR etc., and the shape quality of the wafer can be accurately evaluated over a specification of a strict design rule.

109 Claims, 8 Drawing Sheets

METHOD OF EVALUATING SHAPE OF SEMICONDUCTOR WAFER AND APPARATUS FOR EVALUATING SHAPE OF SEMICONDUCTOR WAFER

TECHNICAL FIELD

The present invention relates to a method of evaluating a shape of a semiconductor wafer and an apparatus for evaluating a shape of a semiconductor wafer to evaluate a shape of a semiconductor wafer represented by a silicon wafer.

BACKGROUND ART

Conventionally, in production of a silicon wafer used as a semiconductor substrate material, a semiconductor wafer is generally produced by growing a cylindrical semiconductor single crystal ingot by Czochralski (CZ) method, Floating Zone (FZ) method, and so forth, cutting (slicing) the grown semiconductor single crystal ingot into a thin plate to produce a wafer, and subsequently subjecting the obtained wafer to a chamfering process for chamfering a peripheral portion of the wafer to prevent breakage or crack of the wafer, a lapping process for adjusting a thickness and flatness of the wafer, an etching process for etching the wafer to remove mechanical damage on the wafer, a polishing process for further improving surface roughness and flatness of the etched wafer to be a mirror surface, and a cleaning process for removing polishing agent and dust particles adhered on the wafer. Main processes are described in these semiconductor wafer production processes. Other processes such as a heat treatment process can be added therein, and the order of the processes can be changed.

In recent years, with remarkably higher integration of a semiconductor device due to breakthrough in semiconductor device technology, a demand for quality on a semiconductor wafer to be a substrate for a semiconductor device has become more strictly. For example, in production of a semiconductor device, a process for forming resist patterns on the semiconductor wafer produced as described above using KrF excimer laser light (wavelength=0.248 μm) which is ultraviolet, or the like, as a light source is generally performed at about 20 times–30 times. Taking DRAM (dynamic random access memory) for an example, on 64 Mbit DRAM, which is currently mass-produced, resist patterns with 0.25 μm–0.20 μm are formed. As device patterns become finer accompanying high integration and high performance of a recent semiconductor integrated circuit as described above, further improvement of size accuracy and overlay accuracy of resist patterns has been desired, and demand for quality on a semiconductor wafer on which circuit patterns are formed has become more strictly.

For example, as device patterns become finer as described above, errors in device patterns occur in a photolithography process etc. even in the case where only extremely small waviness and so on exist on a semiconductor wafer, and therefore a problem that a yield of a semiconductor device decreases has occurred. On the other hand, in order to lower production cost by effective use of a semiconductor wafer, a flat semiconductor wafer up to the vicinity of a periphery of the wafer main surface (at the limit of the chamfered portion) has been desired so as to form a device on the wide area of the wafer.

As one of the important characteristics desired for such a semiconductor wafer to be a substrate for a semiconductor device, shape quality of a semiconductor wafer is mentioned. The shape quality of a semiconductor wafer generally includes various parameters such as diameter, thickness, parallelism, flatness, warpage, waviness called bow, warp, or the like, which is relatively long-period asperity or asperity having a period of several mm, and surface roughness. Recently, in such parameters concerning shape quality, there are many cases where a quality called global flatness of back surface reference or front surface reference, or site flatness of back surface reference or front surface reference is attached importance.

In particular, as an index of flatness, global flatness of back surface reference is called as GBIR (Global Back Ideal Range), and generally defined as a range of displacement between the maximum position and the minimum position to one reference plane being set in the wafer surface. It corresponds to TTV (total thickness variation) which is a conventional and usual specification.

Site flatness of back surface reference is called as SBIR (Site Back Ideal Range), and corresponds to LTV which was considerably frequently used in the past. When setting a back surface of a wafer as a reference plane, and further setting a plane including a site center point at each site as a focus plane, this SBIR is evaluated at each site as the sum of absolute values of maximum displacement values on + side and − side, respectively, from the focus plane in the site. Generally in the case of an 8-inch wafer (a diameter is 200 mm) and so forth, it is evaluated in an area of a site having a size of about 20×20 mm. The size of the site can be varied in accordance with a diameter of the wafer or a specification.

Besides, site flatness of surface reference is called as SFQR (Site Front Least Squares Range). When setting a plane in a site calculated by least squares of data in a determined site as a reference plane, it is evaluated at each site as the sum of absolute values of maximum displacement values on + side and − side, respectively, from the reference plane.

In addition, a quality called nanotopography is also attached importance. Nanotopography (occasionally referred to as nanotopology) is asperity having a wavelength of about 0.2 mm to 20 mm and amplitude of about several nm to 100 nm. As to a method of evaluating thereof, a vertical interval of the asperity on a wafer surface (PV value; peak to valley) is evaluated in a region of a square block area having a side of about 0.1 mm–10 mm or a circular block area having a diameter of about 0.1 mm to 10 mm (this area is called as WINDOW SIZE or the like). This PV value is occasionally referred to as Nanotopography Height, or the like. In evaluation of a semiconductor wafer using nanotopography, it is especially desired that the maximum of asperity existing on a wafer surface is small. Generally, a wafer is measured in multiple square block areas having a size of 2 mm×2 mm, and evaluated by the maximum of PV value thereof. As the maximum of the PV value is smaller, the wafer is evaluated as a more excellent wafer in quality. There is a case where shape quality of a wafer is evaluated by how much area of FQA (Fixed Quality Area) the region over tolerance occupies.

In the case of evaluating shape quality of a semiconductor wafer using the indexes as described above, if a design rule in device production processes was up to 0.18 μm, a semiconductor wafer having sufficient shape quality could be obtained when satisfying the rule. However, as the specification becomes stricter such that the design rule is up to 0.15 μm or further up to 0.13 μm due to recent higher integration of a semiconductor device, there are problems that resist patterns can not be precisely formed on even the semiconductor wafer which satisfies the aforementioned indexes when a device is actually formed on the wafer, and so on. This causes decrease of a yield.

Many treating apparatuses such as an aligner are used in the device production processes. With finer device patterns, compatibility between a chuck for holding a wafer used in each treating apparatus and a wafer shape has become a problem. As to such compatibility between the wafer chuck and the wafer shape, matching between a shape of the wafer chuck and waviness or a shape of a peripheral portion of the wafer is important. In particular, there are many cases that an inflection point where a rate of shape variation is large becomes a problem in the peripheral portion of the wafer. Therefore, there is a need to precisely comprehend a point where the wafer shape varies and a degree thereof.

Although it was possible to accurately evaluate flatness at the center of the wafer with the aforementioned indexes such as GBIR, SBIR and SFQR, it was impossible to accurately evaluate a shape in the peripheral portion of the wafer, in particular in the vicinity of an interface between a main surface of the wafer and a chamfering portion. Also in the case of nanotopography, it was impossible to perform a precise filtering due to no data outside an edge portion of the wafer, and therefore the peripheral portion of the wafer could not be accurately evaluated.

That is, it was impossible to precisely judge a semiconductor wafer preferable for use in a stepper (a common name of a step-type projection aligner) in which a wafer is repeatedly stepped and exposed to projection images of mask patterns (reticle patterns), a scanning-type aligner, and so forth, by use of indexes described above such as SFQR.

Accordingly, in order to precisely judge compatibility between the wafer chuck and the shape of the wafer etc. in each device process, in more detail, in each treating apparatus, an index has been needed, in which a shape of a peripheral portion of a wafer can be accurately evaluated and further shapes of a front surface and a back surface of a wafer can be separately evaluated.

DISCLOSURE OF INVENTION

The present invention was accomplished in view of the aforementioned circumstances. Its object is to provide a method of evaluating a shape of a semiconductor wafer and an apparatus for evaluating a shape thereof, wherein a shape of a semiconductor wafer, in particular a shape of a peripheral portion of the wafer, can be quantitatively evaluated from a viewpoint different from conventional SFQR etc., and the shape quality of the wafer can be accurately evaluated over a specification of a strict design rule.

To achieve the aforementioned object, according to the present invention, there is provided a method of evaluating a shape of a semiconductor wafer comprising the steps of: measuring shape data of a semiconductor wafer by scanning a front surface and/or a back surface of the semiconductor wafer; calculating a differential profile through a differential process of the measured shape data; analyzing the obtained differential profile and obtaining a surface characteristic of the wafer, and; evaluating a shape of the semiconductor wafer.

As described above, if shape data of a semiconductor wafer is measured by scanning a front surface and/or a back surface of the semiconductor wafer, a differential profile is calculated through at least one differential process of the measured shape data, the obtained differential profile is analyzed and a surface characteristic of the wafer is obtained, and a shape of the semiconductor wafer is evaluated, it is possible to accurately quantify a shape of a wafer, for example, a local inflection point on a wafer surface etc. in a measuring level corresponding to nanotopography. Further, since shapes of a front surface and a back surface of the wafer can be separately evaluated, the wafer shape can be evaluated more accurately. As a result, even if a design rule in device production processes becomes strict, a semiconductor wafer on which resist patterns can be precisely formed can be judged, and therefore lowering of a yield can be suppressed.

In this case, the surface characteristic of the semiconductor wafer is preferably obtained at least in the peripheral portion of the semiconductor wafer.

As described above, according to the method of evaluating a shape of a semiconductor wafer of the present invention, a surface characteristic of a peripheral portion of a semiconductor wafer which could not be conventionally evaluated can be obtained. Therefore, a shape of the peripheral portion of the wafer, for example, sag of the peripheral portion of the wafer and the like, can be quantitatively evaluated with accuracy. Moreover, since the shape of the peripheral portion of the wafer can be accurately evaluated as described above, it becomes possible to precisely judge compatibility between a wafer chuck and the shape of the wafer, and so forth.

In this case, it is preferable that the shape data of the semiconductor wafer are measured by scanning the front surface and/or the back surface of the semiconductor wafer at an interval of 1 mm or less.

As an interval for scanning the front surface and/or the back surface of the semiconductor wafer becomes finer, more accurate evaluation can be conducted. Therefore, by scanning the front surface and/or the back surface of the semiconductor wafer at an interval of 1 mm or less, the shape of the semiconductor wafer can be evaluated with sufficiently excellent measurement accuracy.

In this case, the shape data of the semiconductor wafer are preferably displacement data of a plane of the semiconductor wafer and/or thickness data of the semiconductor wafer. Here, the displacement data of the plane of the semiconductor wafer can be displacement of a plane in a direction of thickness in the front surface or the back surface of the wafer when the semiconductor wafer is placed without suction. Or, the thickness data of the semiconductor wafer can be displacement of a plane in a direction of thickness in one main surface of the wafer when an entire of another main surface of the semiconductor wafer is sucked. Or, the displacement data of the plane of the semiconductor wafer can be displacement of planes in a direction of thickness in the front surface and the back surface of the wafer when a part of the semiconductor wafer is sucked with a wafer holder, and the thickness data of the semiconductor wafer can be difference of the displacement data of planes in the front surface and the back surface of the wafer when a part of the semiconductor wafer is sucked.

As described above, if the shape data of the semiconductor wafer are displacement data of a plane of the semiconductor wafer and/or thickness data of the semiconductor wafer, the shape of the semiconductor wafer can be accurately evaluated. In this case, as to the displacement data of the plane of the semiconductor wafer and/or the thickness data of the semiconductor wafer, for example, as described above, the displacement data of the plane of the semiconductor wafer are displacement of planes in a direction of thickness when the wafer is placed without suction, or the thickness data are displacement of a plane in a direction of thickness when the entire of one main surface of the semiconductor wafer is sucked, or the displacement data of the plane of the semiconductor wafer are displacement of a plane in a direction of thickness when a part of the wafer is sucked, and the thickness data are difference of the displacement data of planes in the front surface and the back surface of the wafer. Thereby, the shape data of the semiconductor wafer can be easily and precisely measured.

It is preferable that the differential process of the measured shape data is performed by, at first, drawing a shape profile along a radial direction from the measured shape data, and calculating a differential profile through differentiation of the shape profile at a constant interval with setting an arbitrary point as a reference.

As described above, if, at first, a shape profile along a radial direction is drawn from the measured shape data, and a differential profile is calculated through differentiation of this shape profile at a constant interval with setting an arbitrary point as a reference, a shape of the semiconductor wafer in a radial direction of the semiconductor wafer, in particular, in a peripheral portion, can be evaluated with high accuracy.

In this case, a second differential profile can be used as the differential profile, which is calculated by differentiating the shape profile at a constant interval with setting an arbitrary point as a reference to calculate a first differential profile, and subsequently further differentiating the first differential profile at a constant interval.

As described above, if a second differential profile, which is calculated by differentiating the shape profile to calculate a first differential profile and subsequently further differentiating the first differential profile, is used as the differential profile, the shape of the semiconductor wafer can be evaluated in more detail.

In this case, the shape profile is preferably differentiated at an interval of 1 mm, and the first differential profile is preferably differentiated at an interval of 1 mm.

An interval for differentiating the shape profile can be arbitrarily selected depending on the shape of the semiconductor wafer which is a target of evaluation. However, if the shape profile or the first differential profile is differentiated at an interval of 1 mm as described above, the shape of the semiconductor wafer can be evaluated with excellent accuracy. For example, if the shape profile is differentiated at an interval of 1 mm, the shape of the semiconductor wafer can be evaluated in a measurement level corresponding to nanotopography evaluated in a square of 2 mm×2 mm.

Moreover, removal of components with long wavelengths and/or measured noise is preferably conducted when calculating the differential profile. In this case, the removal of components with long wavelengths can be conducted by means of least squares approximation or high-pass filter, and the removal of the measured noise can be performed by means of moving average or low-pass filter.

As described above, if removal of components with long wavelengths and/or measured noise is conducted when calculating the differential profile, local variation of the wafer shape can be accurately measured even if waviness with a long period, and the like, exist on the semiconductor wafer. Therefore, the shape of the semiconductor wafer can be accurately evaluated. In this case, the removal of components with long wavelengths can be easily conducted by means of least squares approximation or high-pass filter, and the removal of the measured noise can be easily performed by means of moving average or low-pass filter.

The surface characteristic of the semiconductor wafer can be obtained by setting a most peripheral point of the calculated differential profile as a most peripheral data point A1, scanning the differential profile from the most peripheral data point A1 to a center of the wafer and detecting a point where zero is firstly obtained as a Roll Off starting point B1, and performing analysis with setting the Roll Off starting point B1 as a reference.

As described above, if the surface characteristic of the semiconductor wafer is obtained by detecting a Roll Off starting point B1 from the differential profile and performing analysis with setting this Roll Off starting point B1 as a reference, a starting position of Roll Off (a position where a gradient changes from plus to minus) on the semiconductor wafer and a degree thereof can be evaluated as the surface characteristics of the semiconductor wafer. Namely, a starting position of sag or rise on a wafer surface in the peripheral portion of the wafer, particularly sag leading to a chamfering portion, a degree thereof, and the like, can be quantified. Therefore, the shape of the wafer, particularly the shape of the peripheral portion of the wafer, can be accurately evaluated.

Further, the surface characteristic of the semiconductor wafer can be obtained by setting a most peripheral point of the calculated differential profile as a most peripheral data point A1, scanning the differential profile from the most peripheral data point A1 to a center of the wafer and detecting a position where a maximum value is obtained as a Flip Up maximum slope position C1, and performing analysis with setting the Flip Up maximum slope position C1 as a reference. Furthermore, in this case, the surface characteristic of the semiconductor wafer can be obtained by scanning the differential profile from the calculated Flip Up maximum slope position C1 to a center of the wafer and detecting a position where zero is firstly obtained as a Flip Up starting point D1, and performing analysis with setting the Flip Up starting point D1 as a reference.

As described above, if the surface characteristic of the semiconductor wafer is obtained by detecting a Flip Up maximum slope position C1 and a Flip Up starting point D1 from the differential profile and performing analysis with setting each of them as a reference, it becomes possible to evaluate a degree, a position or a condition of Flip Up as the surface characteristic of the semiconductor wafer. For example, if a distance from the center of the wafer to the Flip Up maximum slop position C1 or the Flip Up starting point D1, a distance from C1 to D1, magnitude of the maximum slope at C1 point, and so forth, are quantified as the surface characteristics, it is possible to surely evaluate the shape of the wafer, particularly the shape of the peripheral portion of the wafer by specific standards from a viewpoint different from the conventional one.

Moreover, the surface characteristic of the semiconductor wafer can be obtained by setting a most peripheral point of the second differential profile calculated as the differential profile as a most peripheral data point A2, scanning the second differential profile from the most peripheral data point A2 to a center of the wafer and detecting a position where zero is firstly obtained as a Flip Up maximum slope position C2, and performing analysis with setting the Flip Up maximum slope position C2 as a reference.

As described above, the Flip Up maximum slope position C2, detected as a position where zero is firstly obtained by scanning the second differential profile calculated as the differential profile, approximately corresponds to, for example, a distance from the center of the wafer to the Flip Up maximum slope position C1 detected as above. If the analysis is performed with setting such a Flip Up maximum slope position C2 as a reference, it is possible to accurately analyze a portion where variation in the shape profile is large (a portion where a gradient exists), and the shape of the peripheral portion of the wafer can be evaluated in more detail.

In this case, it is preferable that a threshold is set to the differential profile and a locally abnormal value of the shape of the wafer is detected, and it is preferable that the threshold is set at ±0.01 μm/mm.

As described above, if a threshold is set to the differential profile calculated through the differential process, a locally abnormal value of the wafer shape (an abnormal value of gradient or an abnormal value of curvature) can be detected. Here, if the threshold is set at ±0.01 μm/mm, the locally abnormal value of the wafer shape can be detected with high precision. For example, if the threshold at ±0.01 μm/mm is set to the differential profile calculated through a first differentiation (a first differential profile), it is possible to detect a local gradient of the shape of the wafer in a measurement level corresponding to the case where it is evaluated by nanotopography in a square of 2 mm×2 mm.

The surface characteristic of the semiconductor wafer obtained along the radial direction is preferably calculated all round the wafer. In this case, the surface characteristic all round the semiconductor wafer is preferably obtained at an interval of a central angle of the wafer of 1° or less.

As described above, if the surface characteristic of the semiconductor wafer obtained along the radial direction is calculated all round the wafer, the shape of the semiconductor wafer can be accurately comprehended over the entire wafer or all round the wafer. As a result, for example, it also becomes possible to precisely judge the compatibility between the wafer chuck and the shape of the wafer, and so forth. In this case, if the surface characteristic of the semiconductor wafer is calculated at an interval of a central angle of the wafer of 1° or less and in a radial pattern, it can be evaluated with extremely high accuracy.

Furthermore, according to the present invention, there is provided an apparatus for evaluating a shape of a semiconductor wafer, comprising at least: a shape measuring means for measuring shape data of a semiconductor wafer; a memorizing means for storing the measured shape data; a differential processing means for differentiating the stored shape data and calculating a differential profile, and; a surface characteristic calculating means for obtaining a surface characteristic of the wafer by analyzing the calculated differential profile.

As described above, if an apparatus for evaluating a shape of a semiconductor wafer comprises at least a shape measuring means for measuring shape data, a memorizing means for storing the shape data, a differential processing means for differentiating the shape data and calculating a differential profile, and a surface characteristic calculating means for obtaining a surface characteristic of the wafer by analyzing the differential profile, a shape of the wafer, for example, a local inflection point on a wafer surface or the like, can be quantified in a measurement level corresponding to nanotopography, and further it is possible to separately evaluate shapes of a front surface and a back surface of the wafer and obtain a surface characteristic in a peripheral portion of the semiconductor wafer which could not be evaluated using a conventional apparatus. Therefore, it is possible to obtain an apparatus for evaluating a shape of a semiconductor wafer in which the shape of the wafer can be evaluated more accurately.

In this case, the shape measuring means can be a means such that displacement data of a plane are obtained as the shape data by measuring displacement of a plane in a direction of thickness in a front surface or a back surface of the semiconductor wafer placed without suction. Or, the shape measuring means can be a means such that thickness data are obtained as the shape data by measuring displacement of a plane in a direction of thickness in one main surface of the semiconductor wafer of which the entire of another main surface is sucked. Or, the shape measuring means can be a means such that, as the shape data, displacement data of a plane are obtained by measuring displacement of planes in a direction of thickness in a front surface and a back surface of the semiconductor wafer of which a part is sucked by a wafer holder, and thickness data are obtained by measuring difference of the obtained displacement data of the planes in the front surface and the back surface of the wafer.

If the shape measuring means is the means described above, the shape data of the semiconductor wafer can be measured easily and precisely, and it is possible to accurately evaluate the shape of the semiconductor wafer.

The differential processing means is preferably a means such that a shape profile along a radial direction is drawn from the shape data, and the differential profile is calculated through differentiation of the shape profile at a constant interval with setting an arbitrary position as a reference.

As described above, if the differential processing means is a means such that a shape profile is drawn from the shape data, and the differential profile is calculated through differentiation of this shape profile at a constant interval with setting an arbitrary position as a reference, it can be an apparatus in which the shape in the radial direction of the semiconductor wafer, particularly in the peripheral portion thereof, can be evaluated with high accuracy.

In this case, the differential processing means is preferably a means such that a first differential profile is calculated through differentiation of the shape profile at a constant interval with setting an arbitrary position as a reference, and subsequently a second differential profile is calculated through further differentiation of the first differential profile at a constant interval.

As described above, if the differential processing means is a means such that a first differential profile is calculated through differentiation of the shape profile, and subsequently a second differential profile is calculated through further differentiation of the first differential profile, there can be obtained an apparatus for evaluating a shape in which the shape of the semiconductor wafer can be evaluated with higher accuracy.

In this case, the differential processing means is preferably a means such that removal of components with long wavelengths and/or measured noise is conducted.

As described above, if the differential processing means is a means such that removal of components with long wavelengths and/or measured noise is conducted, it is possible to obtain an apparatus in which, even if waviness with a long period etc. exist on the semiconductor wafer, local variation of the shape of the wafer can be precisely measured, and the accurate evaluation of the shape of the semiconductor wafer can be performed.

The surface characteristic calculating means can be a means such that a most peripheral point of the differential profile is set as a most peripheral data point A1, the differential profile is scanned from the most peripheral data point A1 to a center of the wafer, a point where zero is firstly obtained is detected as a Roll Off starting point B1, analysis is performed with setting the Roll Off starting point B1 as a reference, and the surface characteristic of the wafer is obtained.

As described above, if the surface characteristic calculating means is a means such that a Roll Off starting point B1 is detected from the differential profile, analysis is performed with setting this Roll Off starting point B1 as a reference, and the surface characteristic of the wafer is obtained, it is possible to evaluate a starting position of Roll Off (a position where a gradient changes from plus to minus) in the semiconductor wafer and a degree thereof as the surface characteristics of the semiconductor wafer. Namely, there can be obtained an apparatus in which a starting position of sag or rise on a wafer surface in the peripheral portion of the wafer, particularly sag leading to a chamfering portion, a degree thereof, and the like, can be quantified. Therefore, the shape of the wafer, particularly the shape of the peripheral portion of the wafer, can be accurately evaluated.

The surface characteristic calculating means can be a means such that a most peripheral point of the differential profile is set as a most peripheral data point A1, the differential profile is scanned from the most peripheral data point A1 to a center of the wafer, a point where the maximum value is obtained is detected as a Flip Up maximum slope position C1, analysis is performed with setting the Flip Up maximum slope position C1 as a reference, and the surface characteristic of the wafer is obtained. Moreover, in this case, the surface characteristic calculating means can be a means such that the differential profile is scanned from the calculated Flip Up maximum slope position C1 to a center of the wafer, a position where zero is firstly obtained is detected as a Flip Up starting point D1, analysis is performed with setting the Flip Up starting point D1 as a reference, and the surface characteristic of the wafer is obtained.

As described above, if the surface characteristic calculating means is a means such that a Flip Up maximum slope position C1 and a Flip Up starting point D1 are detected from the differential profile and the surface characteristic of the wafer is obtained with setting each of them as a reference, it becomes possible to evaluate a degree, a position, or a condition of the Flip Up as the surface characteristic of the semiconductor wafer. For example, if a distance from the center of the wafer to the-Flip Up maximum slop position C1 or the Flip Up starting point D1, a distance from C1 to D1, magnitude of the maximum slope at C1 point, and so forth, are quantified as the surface characteristic, there can be obtained an apparatus in which the shape of the wafer, particularly the shape of the peripheral portion of the wafer, can be surely evaluated by specific standards from a viewpoint different from the conventional one.

Furthermore, the surface characteristic calculating means can be a means such that a most peripheral point of the second differential profile calculated as the differential profile is set as a most peripheral data point A2, the second differential profile is scanned from the most peripheral data point A2 to a center of the wafer, a position where zero is firstly obtained is detected as a Flip Up maximum slope position C2, analysis is performed with setting the Flip Up maximum slope position C2 as a reference, and the surface characteristic of the wafer is obtained.

As described above, if the surface characteristic calculating means is a means such that a Flip Up maximum slope position C2 is detected from the second differential profile, analysis is performed with setting this as a reference, and the surface characteristic of the wafer is obtained, the Flip Up maximum slope position C2 approximately corresponds to, for example, a distance from the center of the wafer to the Flip Up maximum slope position C1 detected as above. Therefore, it is possible to accurately analyze a portion where variation of the shape profile is large (a portion where a gradient exists), and the shape of the peripheral portion of the wafer can be evaluated in more detail.

The surface characteristic calculating means is preferably a means such that a threshold is set to the differential profile, and a locally abnormal value of the shape of the wafer is detected.

As described above, if the surface characteristic calculating means is a means such that a threshold is set to the differential profile, a locally abnormal value of the shape of the wafer (an abnormal value of gradient or an abnormal value of curvature) can be detected. For example, if a threshold at ±0.01 μm/mm is set to the differential profile calculated through a first differentiation, there can be obtained an apparatus in which it is possible to detect a local gradient of the shape of the wafer in a measurement level corresponding to the case where it is evaluated by nanotopography in a square of 2 mm×2 mm.

As explained above, according to the present invention, it is possible to quantify a shape of a wafer, for example, a local inflection point and the like, in a measuring level corresponding to nanotopography from a viewpoint different from SFQR etc. which are conventional indexes, and shapes of a front surface and a back surface of the wafer can be separately evaluated. Therefore, the shape of the wafer can be accurately evaluated.

Furthermore, according to the present invention, since a surface characteristic of a peripheral portion of a semiconductor wafer can be accurately calculated, a shape of the peripheral portion of the wafer which was difficult in a conventional way, for example sag of the peripheral portion of the wafer and the like, can be quantitatively evaluated with accuracy.

Moreover, according to the present invention, it is possible to obtain efficient information which could not be obtained in a conventional method for evaluating a shape of a wafer. Thereby, it becomes possible to judge a semiconductor wafer preferable for, e.g., treating apparatuses for lithography, chemical mechanical polishing (CMP), and so forth, and therefore yield in device production processes can be improved. The surface characteristic obtained by the present invention can be utilized as a parameter for analysis of various experimental data. In addition, when these data are stored, it becomes possible to easily comprehend the ability of the production process and so on, and it becomes possible to supply semiconductor wafers stably.

BEST MODE FOR CARRYING OUT THE INVENTION

The embodiments of the present invention will be explained hereinafter, but the present invention is not limited thereto.

In order to evaluate a shape of a semiconductor wafer from a viewpoint different from conventional indexes such as SFQR, the inventors found that, when scanning is performed on a semiconductor wafer so that surface data thereof is measured, and surface characteristics of the wafer are calculated by subjecting the measured shape data to a differential process and a specified analysis, the shape of the semiconductor wafer, particularly a shape of a peripheral portion of the wafer, can be quantitatively evaluated and in addition, the shape of the semiconductor wafer can be accurately evaluated in the case of use in a strict design rule. Then, the inventors have completed the present invention.

Figure 7:
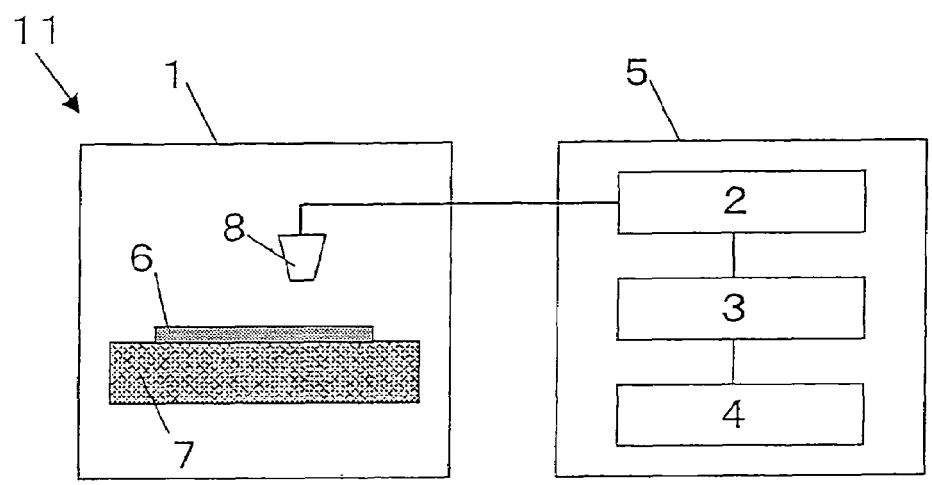
FIG. 7 is a schematically explanatory view showing an example of an apparatus for evaluating a shape of a semiconductor wafer according to the present invention.
Figure 9:
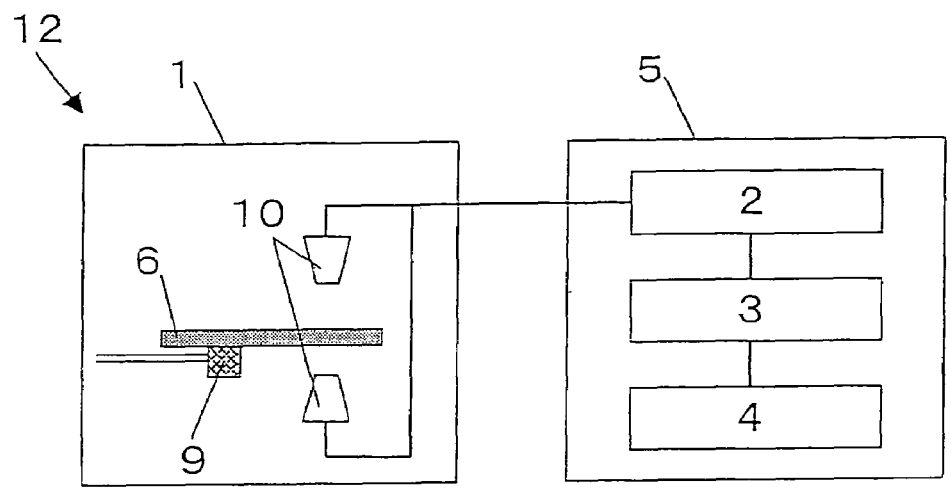
FIG. 9 is a schematically explanatory view showing another example of an apparatus for evaluating a shape of a semiconductor wafer according to the present invention.

At first, an apparatus for evaluating a shape of a semiconductor wafer according to the present invention will be explained in reference to appended drawings. FIG. 7 is a schematically explanatory view showing a main construction of an example of an apparatus for evaluating a shape of a semiconductor wafer according to the present invention. FIG. 9 is a schematically explanatory view showing a main construction of another example of an apparatus for evaluating a shape of a semiconductor wafer according to the present invention.

An apparatus 11 for evaluating a shape of a semiconductor wafer according to the present invention is an apparatus for measuring shape data of a semiconductor wafer and performing differentiation and analysis. It comprises at least a shape measuring means 1 for measuring shape data of a semiconductor wafer, a memorizing means 2 for storing the measured shape data, a differential processing means 3 for differentiating the stored shape data and calculating a differential profile, and a surface characteristic calculating means 4 for obtaining a surface characteristic of the wafer by analyzing the calculated differential profile.

Figure 8:
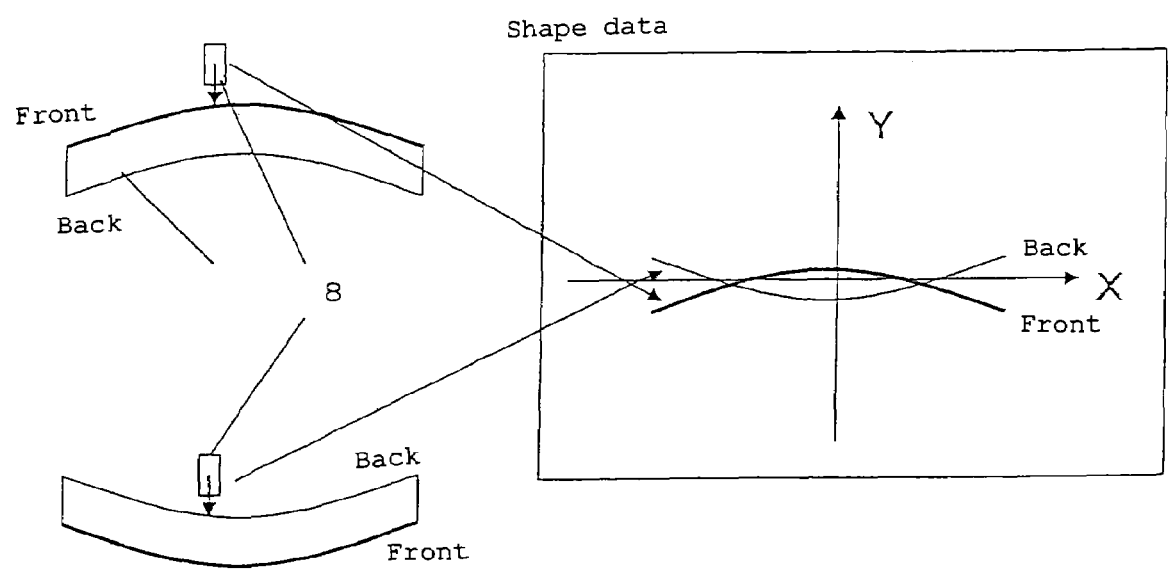
FIG. 8 is an explanatory view illustrating measurement of shape data of a semiconductor wafer using a displacement meter of the apparatus for evaluating a shape of a semiconductor wafer shown in FIG. 7.

Here, in the shape measuring means 1, for example, a semiconductor wafer 6 is placed without suction on a sample table 7 on which an object to be measured is placed, and displacement of a plane in the direction of thickness in a front surface or a back surface of the semiconductor wafer are measured by means of a displacement meter 8. Thereby, for example as shown in FIG. 8, displacement data of the plane can be obtained as the shape data.

Or, for example, the semiconductor wafer 6 is held on the sample table 7 by sucking the entire of one main surface thereof so that the sucked one main surface of the wafer may be forcedly flat, and displacement of a plane in the direction of thickness in another main surface of the semiconductor wafer are measured by means of the displacement meter 8. Thereby, thickness data may also be obtained as the shape data.

Figure 10:
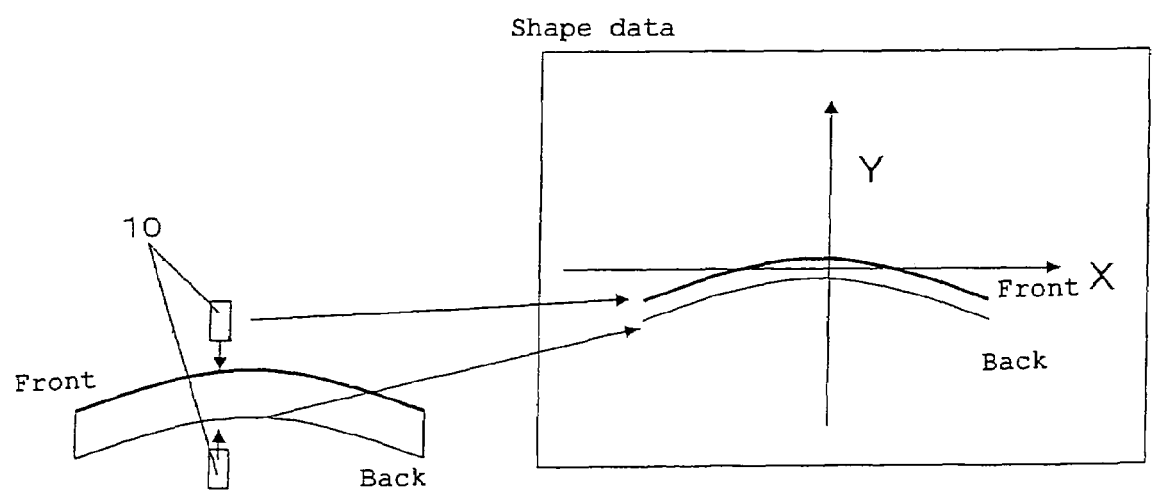
FIG. 10 is an explanatory view illustrating measurement of shape data of a semiconductor wafer using a displacement meter of the apparatus for evaluating a shape of a semiconductor wafer shown in FIG. 9.

As to further other embodiment of the shape measuring means 1, for example as an apparatus 12 for evaluating a shape of a semiconductor wafer shown in FIG. 9, a part of the semiconductor wafer 6 is held with suction by use of a wafer holder 9, and each displacement data of planes in the direction of thickness in a front surface and a back surface of the semiconductor wafer are measured from the upside and the downside of the wafer by two displacement meters 10 for the front surface or the back surface. Thereby, displacement data of each side can be obtained, and thickness data can be obtained by measuring difference of the measured displacement data of the planes in the front surface and the back surface of the wafer, as shown in, for example, FIG. 10. The wafer holder 9 may hold the wafer at a position where it does not prevent the measurement, and may support a part of the main surface of the wafer or a peripheral portion of the wafer.

In this case, the displacement meter 8 or the displacement meters 10 comprises a laser oscillator and an automatic focus mechanism comprising of a CCD (Charge Coupled Device) camera, an automatic focus circuit, and so forth. The displacement meter 8 or the displacement meters 10 as described above can measure displacement of planes in the direction of thickness in the front surface and/or the back surface of the semiconductor wafer by irradiating laser light (for example, HeNe laser etc.) at a specified interval perpendicular to the front surface and/or the back surface of the semiconductor wafer, automatically adjusting focus of a reflected image of the irradiated laser light from the semiconductor wafer by means of the automatically focus mechanism, and measuring shift of a distance from a previously calibrated reference point.

However, the displacement meter in the shape measuring means 1, which measures shape data of a semiconductor wafer, is not limited to a displacement meter which performs measurement using the laser light as explained above. For example, the shape data of a semiconductor wafer may be measured by use of a capacitance-type flatness measuring device which is a capacitance-type displacement meter (a thickness meter) sensor. As such a capacitance-type flatness measuring device, a commercial non-contact wafer thickness, flatness, BOW/WARP measuring device, for example Ultragauge 9900 produced by ADE corporation etc., can be used. That is, if a device can accurately measure a parameter indicating a shape of a semiconductor wafer, namely displacement data of a plane of a semiconductor wafer, thickness data of a semiconductor wafer, etc., it can be used as the shape measuring means 1.

In the apparatus 11 or 12 for evaluating a shape of a semiconductor wafer of the present invention, a memorizing means 2, a differential processing means 3 and a surface characteristic calculating means 4 can be installed into a computer 5 comprising CPU (Central Processing Unit), RAM (Random Access Memory), ROM (Read Only Memory), and so forth. The computer 5, for example, can input shape data of a semiconductor wafer outputted from the displacement meter 8 and store it in the memorizing means 2, read out a specified analysis program build into the ROM, namely, the differential processing means 3 and the surface characteristic calculating means 4, with the RAM as a work area, and obtain a surface characteristic from the shape data previously stored with CPU.

Next, a method of evaluating a shape of a semiconductor wafer will be explained using the apparatus for evaluating a shape of a semiconductor wafer of the present invention as described above.

A method of evaluating a shape of a semiconductor wafer according to the present invention is characterized in that a shape of a semiconductor wafer is evaluated by scanning a front surface and/or a back surface of the semiconductor wafer and measuring shape data of the semiconductor wafer, calculating a differential profile through differentiation of the measured shape data, and analyzing the obtained differential profile to obtain a surface characteristic of the wafer. In this case, as the differential profile, a differential profile of first differentiation calculated through first differentiation of the shape data can be used, or a differential profile of second differentiation calculated through further differentiation of the differential profile of first differentiation can be used.

In accordance with such a method of evaluating a shape of a semiconductor wafer of the present invention, it becomes possible to obtain a surface characteristic of the wafer in a peripheral portion of the semiconductor wafer which were conventionally difficult to evaluate, without mentioning a surface characteristic at the center of a semiconductor wafer. Thereby, it becomes possible to evaluate a shape of the wafer with precision and excellent measurement accuracy.

Figure 11:
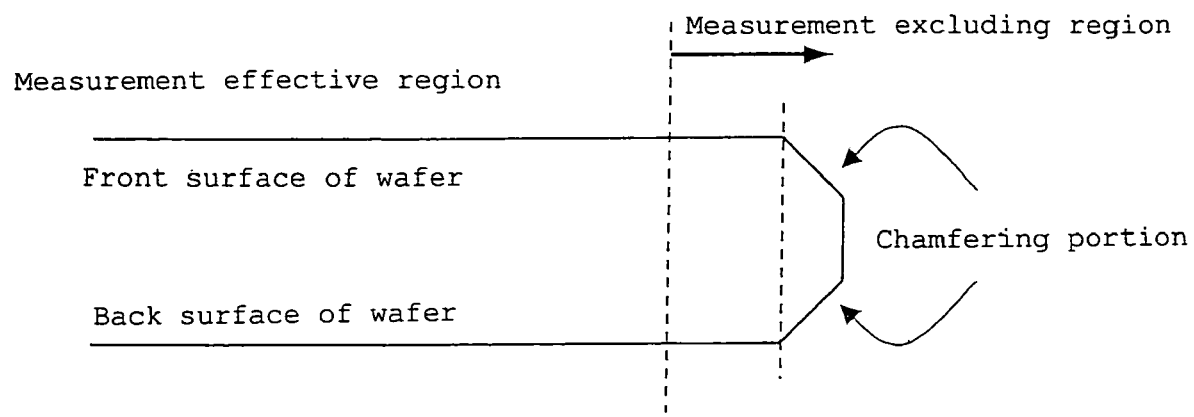
FIG. 11 is a schematically explanatory view schematically showing a shape of a peripheral portion of a semiconductor wafer.

In such a method of evaluating a shape of a semiconductor wafer of the present invention, evaluation of the shape of the wafer is preferably performed excluding a region within 1 mm–2 mm from a periphery of the semiconductor wafer. In the state of the art, flatness etc. in a region where a device is formed is assured in a region excluding a peripheral portion of 3 mm. In the method of evaluating a shape of a semiconductor wafer of the present invention, it is preferable that evaluation is performed within the same region as this assured region, or up to the region further outside this region. For example, if evaluation is performed excluding a region within 1 mm–2 mm from a periphery of a wafer, it can be used for assurance of flatness in a region excluding a peripheral portion of 2 mm, or assurance of a region excluding a periphery portion of 1 mm, which will be required in future. However, since the peripheral portion of the semiconductor wafer is generally subjected to a chamfering process in order to prevent cracks of the wafer etc., a chamfering portion is formed as shown in FIG. 11. A width of this chamfering portion varies in accordance with a production method of a wafer, and it is generally about 300–500 μm. In recent years, it is desired that evaluation of the shape of the wafer is performed up to the vicinity of an interface between a main surface of the wafer and a chamfering portion. However, taking measurement accuracy etc. into consideration, a shape of a semiconductor wafer can be evaluated with more excellent measurement accuracy by excluding a region within 1 mm from a periphery of the semiconductor wafer including the chamfering portion (a measurement excluding region).

Hereinafter, a method of evaluating a shape of a semiconductor wafer of the present invention will be explained in more detail with reference to the appended drawings.

Firstly, a front surface and/or a back surface of the semiconductor wafer which is an object to be measured are scanned, and shape data of a semiconductor wafer are measured using a shape measuring means. As the shape data of the semiconductor wafer, displacement data of a plane of the semiconductor wafer and/or thickness data of the semiconductor wafer can be obtained.

For example, as described above, displacement data of a plane of a semiconductor wafer can be obtained as the shape data of the semiconductor wafer by measuring displacement of a plane in the direction of thickness in the front surface or the back surface of the wafer when the semiconductor wafer is placed without suction. Or, thickness data of the semiconductor wafer can be obtained as the shape data of a semiconductor wafer by measuring displacement of a plane in the direction of thickness in one main surface of the wafer when the entire of another main surface of the semiconductor wafer is sucked. Or, as the shape data of the semiconductor wafer, displacement data of a plane of a semiconductor wafer can be obtained by measuring displacement of planes in the direction of thickness in the front surface and the back surface of the wafer when a part of the semiconductor wafer is sucked with a wafer holder, and thickness data of a semiconductor wafer can be obtained by measuring difference of these displacement data of the planes in the front surface and the back surface of the wafer.

As described above, the shape data of the semiconductor wafer can be easily measured by obtaining the displacement data of the plane of the semiconductor wafer and/or the thickness data of the semiconductor wafer as the shape data of the semiconductor wafer.

Subsequently, the measured shape data is successively stored in the aforementioned memorizing means in the computer.

In this case, as for the shape data of the semiconductor wafer, the front surface and/or the back surface of the semiconductor wafer are scanned at a fine measurement interval, and thereby the shape of the semiconductor wafer can be evaluated with excellent accuracy. For example, if an interval when scanning the semiconductor wafer is 1 mm or less, particularly about 0.05 mm, the shape of the semiconductor wafer can be evaluated with excellent measurement accuracy.

Figure 2:
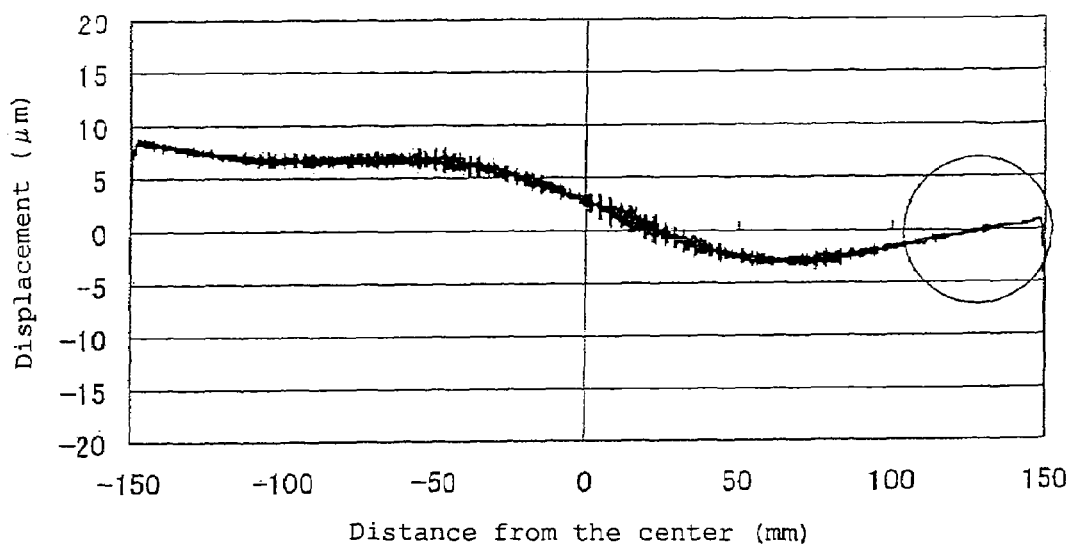
FIG. 2 is a graph showing shape data obtained by measuring displacement data of a surface of a semiconductor wafer.

As described above, by scanning a front surface and/or a back surface of a semiconductor wafer using a shape measuring means, for example, shape data of a semiconductor wafer as shown in FIG. 2 can be measured. FIG. 2 shows displacement data of a plane of a semiconductor wafer calculated by measuring displacement of a plane in the direction of thickness in a front surface of the wafer at a measurement interval of about 0.05 mm using a displacement meter when a semiconductor wafer having a diameter of 300 mm is placed without suction. FIG. 2 shows the displacement in a range from −150 mm to 150 mm in the radial direction with setting the center of the wafer as a reference in two dimensions. In the shape data of FIG. 2, waviness with a long period and measurement noise can be observed, and it is found that the shape data drastically varies at a position of about 0.5 mm from a periphery of the wafer as a chamfering portion.

In this case, a sign (plus, minus) of the shape data changes to plus or minus depending which of a front surface or a back surface is set as one main surface of a wafer. Therefore, the shape data of the front surface (or the back surface) of the wafer is arbitrarily expressed with either sign. A direction of rise or sag on a wafer surface in the peripheral portion of the wafer has only to be evaluated without mistake when evaluating the shape of the wafer.

Next, as to the aforementioned shape data measured using the shape measuring means and stored in the memorizing means, the shape data is differentiated using the aforementioned differential processing means, and thereby a differential profile is calculated.

At first, a shape profile along a radial direction is drawn from the measured shape data. For example, a shape profile in a range of 120–148 mm from the center of the wafer (2 mm from the periphery of the wafer is defined as a measurement excluding region) along the radial direction is drawn from the shape data in FIG. 2, and thereby a shape profile shown in FIG. 3 can be obtained.

Figure 3:
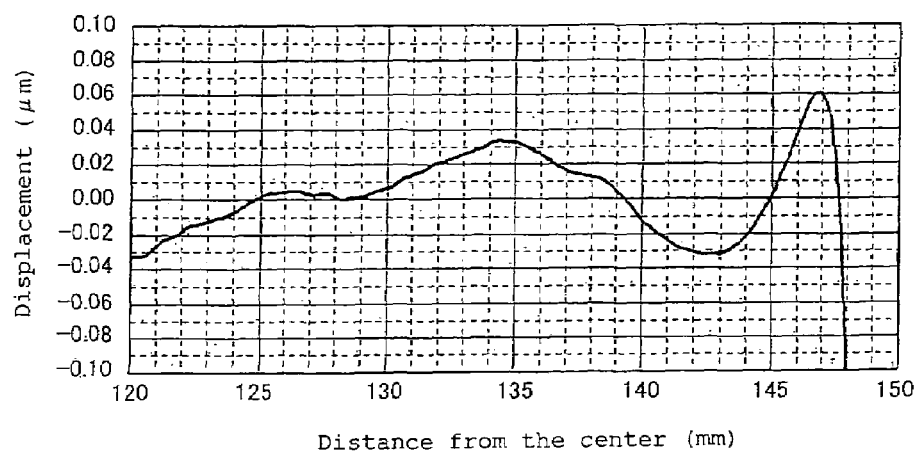
FIG. 3 is a graph showing a shape profile in a range of 120–148 nm from the center of a semiconductor wafer.

The shape profile in FIG. 3 is obtained by drawing the shape profile from the shape data in FIG. 2, subsequently subjecting it to least squares approximation for removal of components with long wavelengths, and further operating moving average of about 1–2 mm for removal of measurement noise. In this manner, if the shape profile is drawn and subsequently components with long wavelengths such as warp and/or measurement noise are removed, local variation of the wafer shape can be precisely measured, and therefore the shape of the semiconductor wafer can be evaluated with excellent measurement accuracy.

In this case, a method for removing components with long wavelengths or measurement noise is not limited to the method as described above. For example, the components with long wavelengths can be easily removed by means of high-pass filter etc., as well as the least squares approximation. The measurement noise can be easily removed by means of low-pass filter etc., as well as the moving average. However, such removal of measurement noise is not always performed.

The removal of components with long wavelengths can be performed after calculating a differential profile through a subsequent differential process, without performing in the state of the shape profile.

Figure 6:
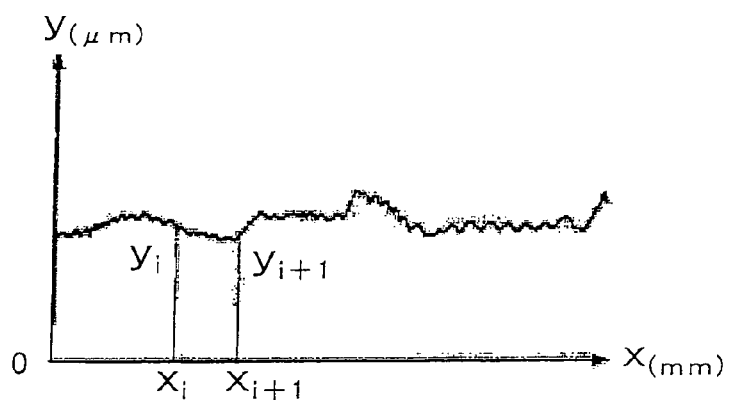
FIG. 6 is a graph illustrating finite difference when performing a differential process.

Subsequently, as to the drawn shape profile (FIG. 3), finite difference is obtained at a constant interval with setting an arbitrary position as a reference, data are plotted at a midpoint thereof, and thereby a differential profile is calculated. For example, in the case where a shape profile as shown in FIG. 6 is obtained, a value, in which difference between magnitude $Y_{i+1}$ (μm) of the shape profile at $X_{i+1}$ (mm) and magnitude $Y_i$ (μm) of the shape profile at $X_i$ (mm) is divided by a constant interval $(X_{i+1}-X_i)$ with setting an arbitrary position $X_i$ (mm) as a reference, is calculated as a differential value (dyi), and after that the data are plotted at a midpoint of the interval $(X_{i+1}-X_i)$. Thereby a differential profile can be calculated.

In this case, a second differential profile can be used as the differential profile, which is calculated by differentiating the shape profile using the differential processing means at a constant interval with setting an arbitrary point as a reference to calculate a first differential profile, and subsequently further differentiating the first differential profile at a constant interval. If the second differential profile is calculated as the differential profile in this manner, the shape of the semiconductor wafer can be evaluated with higher accuracy.

In this case, the interval $(X_{i+1}-X_i)$ for differentiation of the shape profile and furthermore the interval for differentiation of the first differential profile are arbitrarily selected depending the shape of the semiconductor wafer which is an object to be evaluated. If these intervals are set at 1 mm, it is possible to evaluate the shape of the semiconductor wafer with high accuracy. For example, if the shape profile is differentiated at an interval of 1 mm, the shape of the semiconductor wafer can be evaluated in an excellent measurement level corresponding to nanotopography evaluated in a square of 2 mm×2 mm.

Since the shape data is differentiated using the differential processing means as described above, a differential profile can be calculated from the shape data by specific standards. For example, if the shape profile in FIG. 3 described above is differentiated (first differentiation), the differential profile shown in FIG. 1 can be calculated. The axis of ordinates indicates differential values, and corresponds to magnitude of a gradient of asperity. If the differential profile (FIG. 1) calculated as above is analyzed using a surface characteristic calculating means, a surface characteristic of the wafer can be obtained, and sufficiently effective information relating to the wafer shape can be obtained. Hereinafter, a method for obtaining a surface characteristic by analyzing a differential profile will be explained.

The surface characteristic of a semiconductor wafer of the present invention can be calculated using the surface characteristic calculating means by setting a most peripheral point of the calculated differential profile as a most peripheral data point A1, scanning the differential profile from the most peripheral data point A1 to the center of the wafer and detecting a point where zero is firstly obtained as a Roll Off starting point B1, and performing analysis with setting the Roll Off starting point B1 as a reference.

That is, if the Roll Off starting point B1 is set as a reference, and, for example, magnitude at an arbitrary point between A1–B1 is investigated, intensity of Roll Off can be calculated. As the absolute value of the magnitude is larger, the intensity of Roll Off becomes larger. Furthermore, if a distance from the center of the wafer to the Roll Off starting point B1 (or a distance from B1 to a periphery of the wafer) is investigated, the starting position of Roll Off can be calculated. As a result, it becomes possible to precisely quantify a starting position of sag and rise on a wafer surface in the peripheral portion of the wafer, degree thereof, etc., and the shape of the semiconductor wafer, particularly the shape of the peripheral portion of the wafer can be accurately evaluated.

The surface characteristic of a semiconductor wafer of the present invention can also be obtained using the surface characteristic calculating means by setting a most peripheral point of the calculated differential profile as a most peripheral data point A1, scanning the differential profile from the most peripheral data point A1 to the center of the wafer and detecting a position where a maximum value is obtained as a Flip Up maximum slope position C1, further scanning the differential profile from the Flip Up maximum slope position C1 to the center of the wafer and detecting a position where zero is firstly obtained as a Flip Up starting point D1, and performing analysis with setting the Flip Up maximum slope position C1 and the Flip Up starting point D1 as a reference.

That is, intensity of Flip Up can be calculated from magnitude of the Flip Up maximum slope position C1 through analysis with setting the Flip Up maximum slope position C1 and the Flip Up starting point D1 as references. Moreover, for example, distances from the center of the wafer to the Flip Up maximum slope position C1 and the Flip Up starting point D1, or a distance from C1 to D1 are quantified as surface characteristics, and thereby the wafer shape, particularly the shape of the peripheral portion of the wafer can be surely evaluated with a specific standard from a viewpoint different from conventional SFQR and the like.

In the case of using the second differential profile as the differential profile, the surface characteristic of the semiconductor wafer of the present invention can be obtained using the surface characteristic calculating means by setting a most peripheral point of the calculated second differential profile as a most peripheral data point A2, scanning the second differential profile from the most peripheral data point A2 to the center of the wafer and detecting a position where zero is firstly obtained as a Flip Up maximum slope position C2, and performing analysis with setting the Flip Up maximum slope position C2 as a reference.

The Flip Up maximum slope position C2 detected as above approximately corresponds to, for example, a distance of the Flip Up maximum slope position C1 detected as above from the center of the wafer. Accordingly, if analysis is performed with setting the Flip Up maximum slop position C2 as a reference, a portion where displacement of the shape profile is large (a portion where a gradient exists) can be precisely analyzed and a Flip Up position of the wafer can be detected with high accuracy. Therefore, the shape of the peripheral portion of the wafer can be evaluated in more detail.

Since effective information which is not available in a conventional evaluation method of a shape of a wafer can be obtained by calculating such surface characteristics, problems such as compatibility between a wafer chuck and a wafer shape in device production processes etc. are quantitatively evaluated and analyzed. Thereby, a yield of the device processes can be improved, and it can also be utilized as a parameter for analyzing various experiment data.

A threshold is set to the calculated differential profile using the surface characteristic calculating means, and thereby a locally abnormal value of the wafer shape, e.g., an abnormal value of gradient or an abnormal value of curvature, can be automatically detected. In this case, if the threshold is set at ±0.01 μm/mm, the locally abnormal value of the wafer shape can be detected with high accuracy. For example, if a threshold is set to a differential profile calculated through first differentiation (a first differential profile) at ±0.01 μm/mm, a local gradient of the wafer shape can be detected in a measurement level corresponding to the case where it is evaluated by nanotopography in a size of 2 mm×2 mm.

In this case, the surface characteristics of the semiconductor wafer obtained along the radial direction as described above are calculated all round the wafer, and thereby the shape all round the semiconductor wafer can be accurately comprehended. Since the shape all round the wafer is evaluated as described above, for example, it becomes possible to precisely judge the compatibility between the wafer chuck and the wafer shape, etc. In this case, if the surface characteristic of the semiconductor wafer is calculated at an interval of a central angle of the wafer of 1° or less, for example, in a radial pattern having about 360–400 lines on the wafer surface, the shape all round the semiconductor wafer can be evaluated with high accuracy.

As described above, according to the method of evaluating a shape of a semiconductor wafer of the present invention, a shape of a wafer, for example, a local inflection point, can be quantified in a measurement level corresponding to nanotopography from a viewpoint different from SFQR etc. which are conventional indexes, and shapes of a front surface and a back surface of a wafer can be separately evaluated. Therefore, it is possible to evaluate a shape of a wafer accurately.

When evaluating a shape of a semiconductor wafer, if the surface characteristic of the present invention as described above is combined with other evaluation parameters which are flatness and surface roughness such as conventionally used SFQR, a shape of a semiconductor wafer can be evaluated in more detail.

Further according to the present invention, since effective information which is not available in a conventional method of evaluating a shape of a wafer can be obtained, it becomes possible to judge a semiconductor wafer preferable for treating apparatuses for such as lithography and chemical mechanical polishing (CMP), and apply it to production of a wafer with higher quality by further locally subjecting the wafer to plasma etching etc. based on the obtained surface characteristics. As a result, quality and yield in device production processes can be improved.

The surface characteristics obtained in the present invention can also be utilized as parameters for analyzing various experiment data, and in addition, ability of the production processes etc. can be easily comprehended owing to storage of these data. Thereby, semiconductor wafers can be stably supplied.

Hereinafter, the present invention will be explained in more detail with giving Examples. However, the present invention is not limited thereto.

EXAMPLE 1

At first, a silicon single crystal having a diameter of 300 mm was pulled by Czochralski method, and the obtained single crystal was subjected to slicing, chamfering, lapping and polishing so that a silicon wafer was produced. After that, the produced silicon wafer having a diameter of 300 mm was placed on a sample table 7 without suction using an apparatus 11 for evaluating a shape as shown in FIG. 7. A surface of the wafer was scanned using a displacement meter 8 and displacement data of the surface of the wafer as shown in FIG. 2 were calculated as shape data, then they were stored in a memorizing means 2 in a computer 5.

Next, a shape profile in a range of 120–148 mm from the center of the wafer along a radial direction was drawn from the shape data in FIG. 2. Subsequently it was subjected to moving average of 2 mm to remove measurement noise, and components with long wavelengths was removed by means of least squares approximation. Thereby, a shape profile of a peripheral portion as shown in FIG. 3 was drawn, in which components with long wavelengths and measurement noise were removed. After that, the drawn shape profile (FIG. 3) was differentiated at an interval of 1 mm, and a differential profile as shown in FIG. 1 was calculated.

Figure 1:
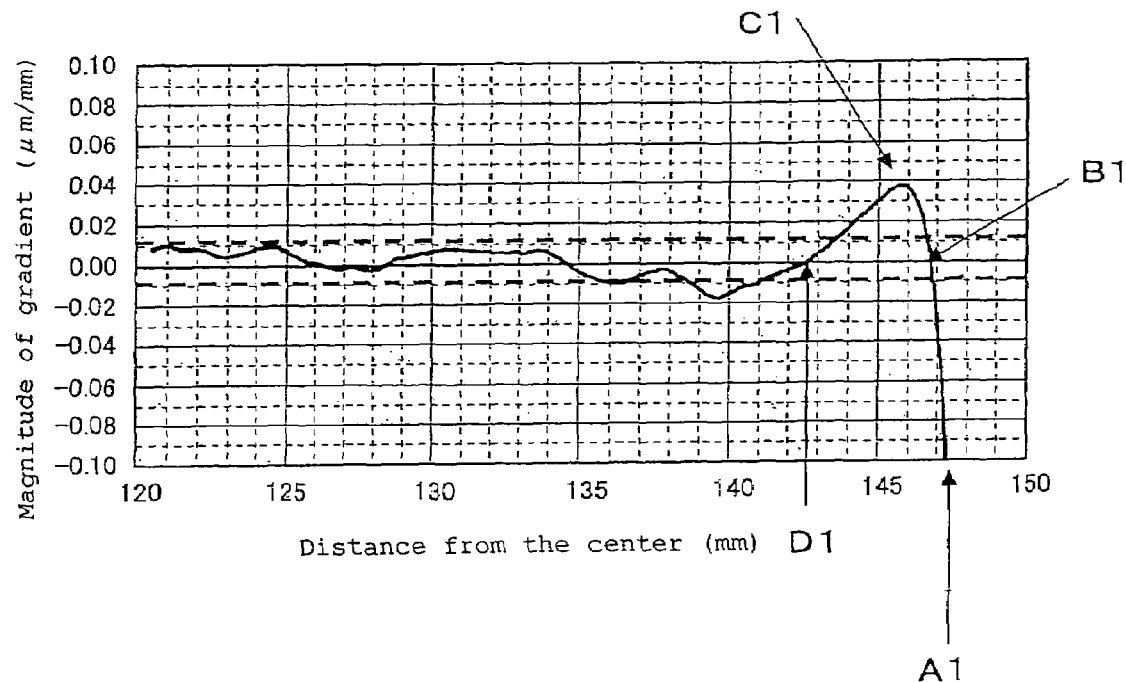
FIG. 1 is graph showing a differential profile calculated with a differential processing means of the present invention.

Subsequently, a most peripheral data point A1, a Roll Off starting point B1, a Flip Up maximum slope position C1 and a Flip Up starting point D1 were detected from the obtained differential profile (FIG. 1). Then, with setting these parameters as references, analyses were performed with setting a distance from the center of the wafer to the Roll Off starting point B1 as surface characteristic B, magnitude of a gradient at the Flip Up maximum slope position C1 as surface characteristic C, and a distance from the center of the wafer to the Flip Up starting point D1 as surface characteristic D. A locally abnormal value (an abnormal value of gradient) of the wafer shape was evaluated with setting a threshold at ±0.01 μm/mm.

As a result, a shape of the silicon wafer produced in Example 1 could be evaluated as surface characteristic B=146.8 mm, surface characteristic C=0.039 μm/mm, and surface characteristic D=142.8 mm. By setting the threshold, a local gradient of the wafer shape could be detected in the vicinity of 139.5 mm from the center of the wafer.

EXAMPLE 2

At first, a silicon single crystal having a diameter of 300 mm was pulled by Czochralski method, and the obtained single crystal was subjected to slicing, chamfering, lapping and polishing so that a silicon wafer was produced. In this case, the condition for polishing the wafer was different from the condition in Example 1, and the others were almost the same as Example 1. Thereby, a silicon wafer was produced.

After that, a peripheral portion of the produced silicon wafer having a diameter of 300 mm was held with a wafer holder using an apparatus 12 for evaluating a shape in which measurement was performed from both front and back surfaces as shown in FIG. 9. As shape data, displacement data of planes in a front surface and a back surface of the semiconductor wafer were measured using a displacement meter 10, and thickness data were obtained by calculating difference of the measured displacement data of the planes in the front surface and back surface of the wafer. Then, they were stored in a memorizing means 2 in a computer 5. In this case, the measurement was performed using Nanometro (trademark) 300TT (produced by Kuroda Precision Industries Ltd.) as the displacement meter 10, which is a measuring device of a non-contact laser displacement meter (two-head system).

Next, shape profiles in a range of 120–148 mm from the center of the wafer along the radial direction were drawn from the obtained shape data, namely, each of the displacement data of the planes in the front surface and the back surface of the wafer and the thickness data. Three shape profiles consisting of the displacement of the plane in the front surface, the displacement of the plane in the back surface, and the thickness of the wafer drawn as above were shown in FIG. 4.

Figure 4:
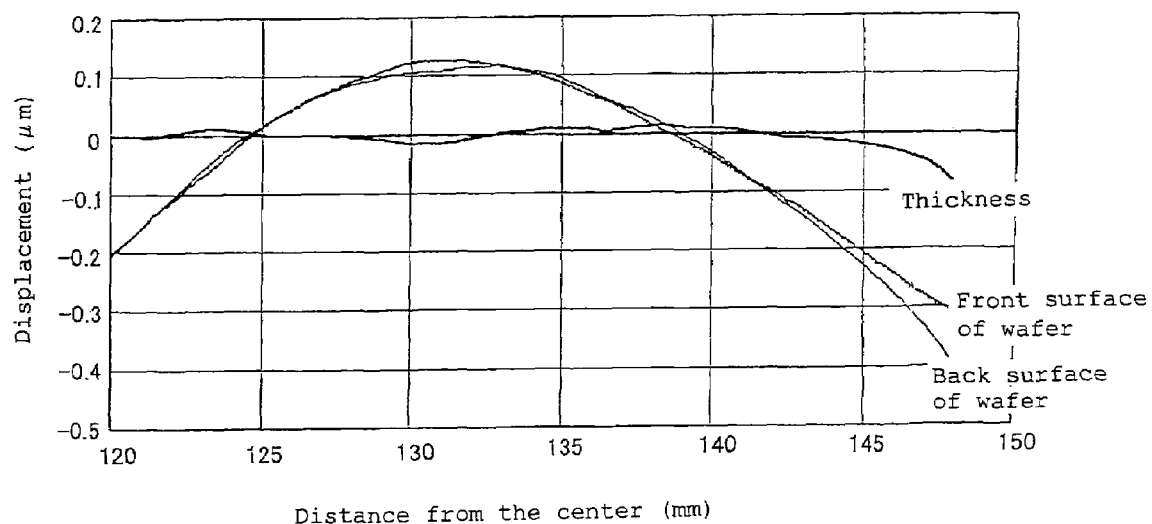
FIG. 4 is a graph showing three shape profiles drawn in Example 2 consisting of displacement of a plane in a front surface of a wafer, displacement of a plane in a back surface of the wafer, and a thickness of the wafer.

Subsequently, each of the shape profiles in FIG. 4 was subjected to moving average of 2 mm to remove measurement noise. Then, a differential profile was calculated through differential process at an interval of 1 mm, and components with long wavelengths were removed by means of least squares approximation. Thereby, three differential profiles consisting of displacement of a plane in the front surface of the wafer, displacement of a plane in the back surface of the wafer, and thickness of the wafer was obtained as shown in FIG. 5.

Figure 5:
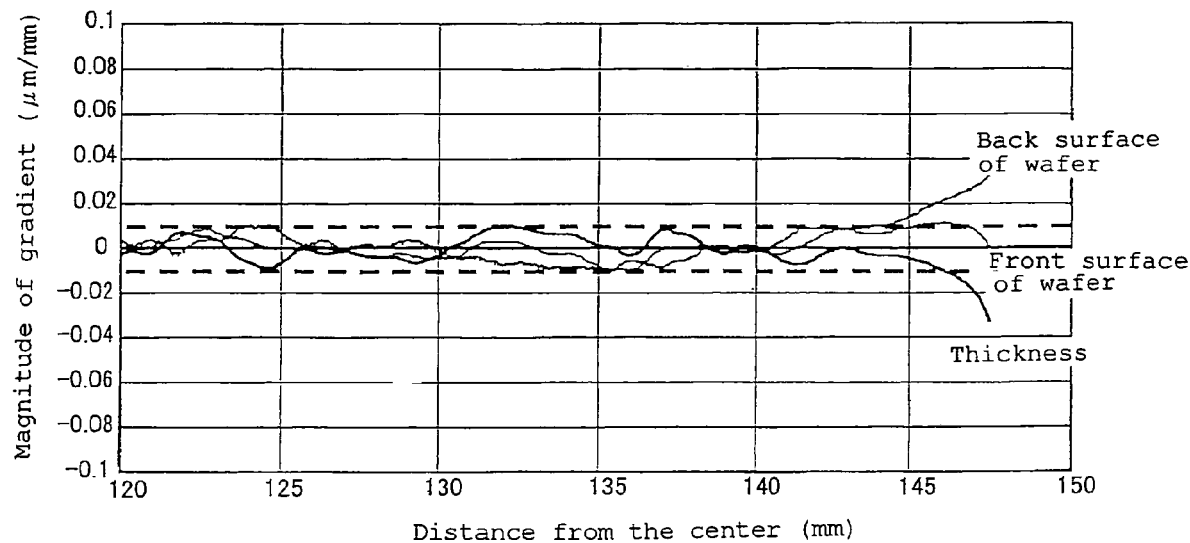
FIG. 5 is a graph showing three differential profiles calculated in Example 2 consisting of displacement of a plane in a front surface of a wafer, displacement of a plane in a back surface of the wafer, and a thickness of the wafer.

After that, each of the differential profiles in FIG. 5 was analyzed in the same manner as Example 1, and surface characteristics B, C and D were calculated. And a threshold was set at ±0.01 µm/mm, and a locally abnormal value (an abnormal value of gradient) of the wafer shape was evaluated.

As a result, a shape of the silicon wafer produced in Example 2 could be evaluated as, with regard to a shape of the front surface of the wafer, surface characteristic B=147.5 mm, surface characteristic C=0.011 µm/mm, and surface characteristic D=141.4 mm, with regard to the shape of the back surface of the wafer, surface characteristic B=140.3 mm, surface characteristic C=0.033 µm/mm, and surface characteristic D=140.0 mm, and with regard to the thickness of the wafer, surface characteristic B=142.9 mm, surface characteristic C=0.00 µm/mm, and surface characteristic D=140.0 mm. As to the silicon wafer in Example 2, it was found that no local gradient on both front and back surfaces of the wafer was present in a range of 120–144.2 mm from the center of the wafer in spite of setting the threshold.

As explained above, since large waviness exists on the silicon wafer in Example 2, it is difficult to evaluate local variation of a wafer shape etc. by use of indexes such as SFQR which were conventionally used. However, according to the present invention, even in the case of any wafer shape, surface characteristics thereof can be obtained and accurately evaluated.

For comparison, surface shapes of both silicon wafers produced in Example 1 and Example 2 were evaluated by use of SFQR. As a result, both wafers showed almost the same values of about 0.13 µm, and it was impossible to accurately evaluate distinction of shapes of the wafers as the present invention.

EXAMPLE 3

A mirror-polished silicon wafer having a diameter of 300 mm was prepared as in Example 1. A surface of the wafer was scanned using the apparatus 11 for evaluating a shape as shown in FIG. 7, and thereby displacement data of the surface of the wafer were calculated as shape data. Next, shape profiles of 360 lines in a range of 120–149 mm from the center of the wafer along a radial direction were drawn from the obtained shape data of the surface of the wafer at an interval of a central angle of the wafer of 1°. Subsequently each of the obtained profiles was subjected to moving average of 2 mm to remove measurement noise, and then a differential profile thereof was calculated through differentiation at an interval of 1 mm.

The calculated differential profiles of 360 lines all round the wafer were divided into 4 areas at an interval of 90°, and averages of differential profiles of 90 lines in respective areas were calculated, so that average differential profiles were drawn. That is, an average differential profile R11 was drawn from differential profiles in a range of 0–89° with setting a notch position as a reference. In the same manner, an average differential profile R21 was drawn from a range of 90–179°, an average differential profile R31 was drawn from a range of 180–269°, and an average differential profile R41 was drawn from a range of 270–359° were drawn, respectively. After that, as to each of the obtained average differential profiles, components with long wavelengths were removed by means of least squares approximation, and thereby differential profiles as shown in FIG. 12 were calculated.

Figure 12:
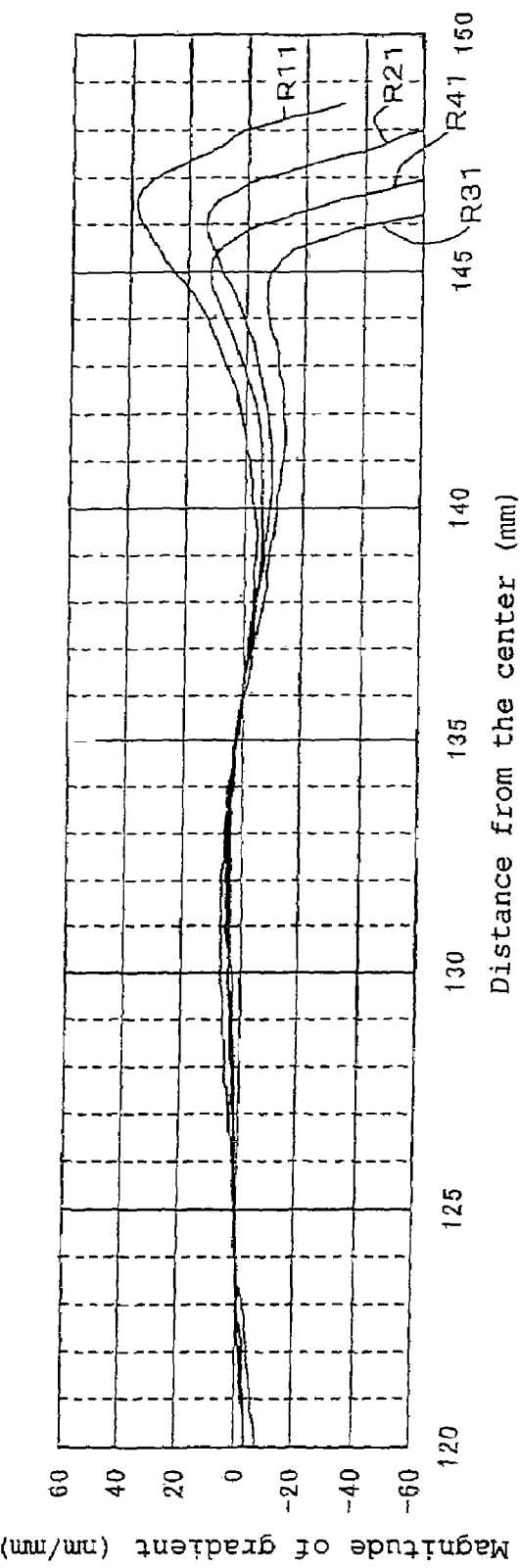
FIG. 12 is a graph showing average differential profiles calculated in Example 3.

Each of the average differential profiles as obtained in FIG. 12 was analyzed in the same manner as Example 1, and surface characteristics B, C and D were calculated. As a result, in the case of the average differential profile R11, surface characteristic B=148.0 mm, surface characteristic C=38 nm/mm, and surface characteristic D=141.5 mm were obtained, in the case of the average differential profile R21, surface characteristic B=146.8 mm, surface characteristic C=17 nm/mm, and surface characteristic D=144.0 mm were obtained, in the case of the average differential profile R31, surface characteristic B=136.0 mm, surface characteristic C=8 nm/mm, and surface characteristic D=125.0 mm were obtained, and in the case of the average differential profile R41, surface characteristic B=145.9 mm, surface characteristic C=7 nm/mm, and surface characteristic D=143.0 mm were obtained. As described above, the surface shape of the silicon wafer could be evaluated.

Figure 13:
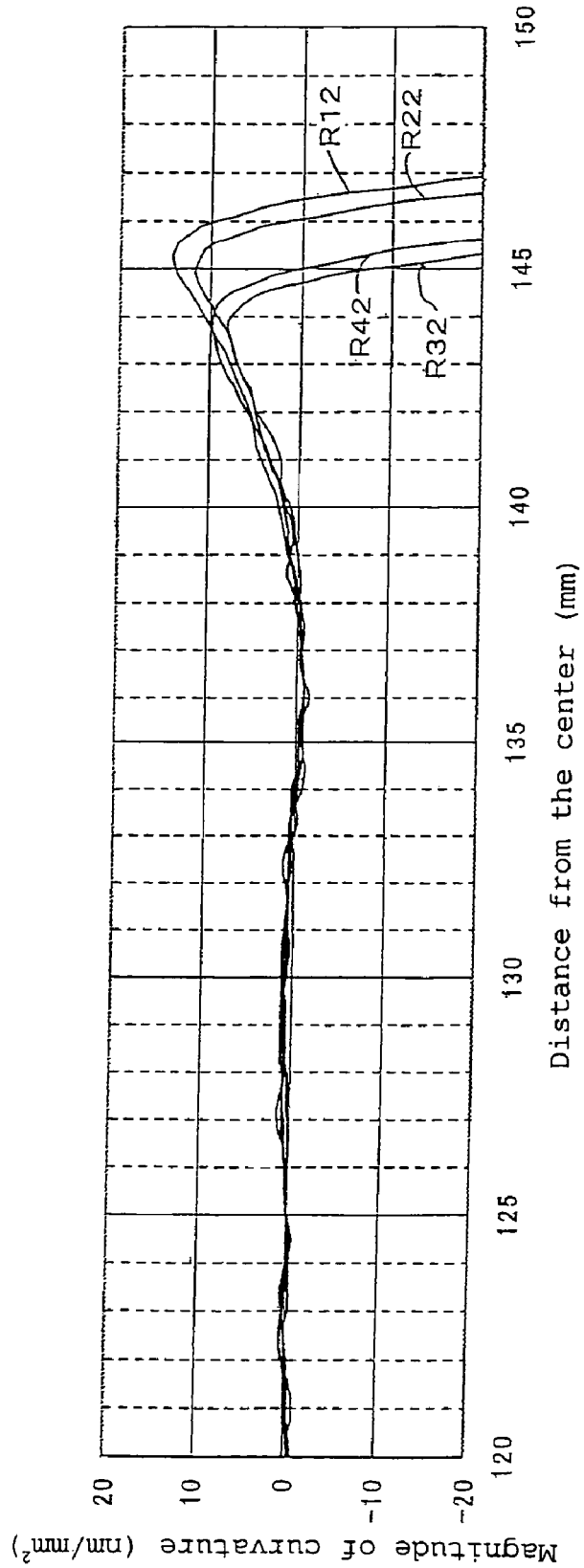
FIG. 13 is a graph showing average second differential profiles in Example 3 calculated through further differentiation of the average differential profiles in FIG. 12.

Next, after each of the above average differential profiles was further differentiated at an interval of 1 mm so that second differential profiles were calculated, components with long wavelengths were removed by means of least squares approximation. In this case, a differential profile calculated through differentiation of the average differential profile R11 was referred to as an average second differential profile R12. In this manner, average differential profiles calculated through differentiation of the average differential profiles R21, R31, R41 were referred to as average second differential profiles R22, R32, R42, respectively. The results are shown in FIG. 13. The axis of ordinates of FIG. 13 indicates (second) differential values, and corresponds to magnitude of curvature.

Each of the obtained average second differential profiles was scanned from a most peripheral data point to the center of the wafer, and a position where zero was firstly obtained was detected as a Flip Up maximum slope position C2. A distance from the center of the wafer to the Flip Up maximum slope position C2 was analyzed as surface characteristic E.

As a result, the surface characteristic E of the average second differential profile R12 was 146.5 mm, the surface characteristic E of the average second differential profile R22 was 146.0 mm, the surface characteristic E of the average second differential profile R32 was 144.8 mm, and the surface characteristic E of the average second differential profile R42 was 145.0 mm. The shape of the silicon wafer could be evaluated in more detail.

The present invention is not limited to the embodiments described above. The aforementioned aspects are mere examples, and those having substantially the same structure as technical ideas described in the appended claims and providing the similar functions and advantages are included in the scope of the present invention.

For example, evaluation of a shape of a peripheral portion of a semiconductor wafer is mainly explained in the above embodiments. However, the present invention is not limited thereto, and there is no need to say that a shape of the entire wafer from the center of the wafer to the periphery of the wafer can also be evaluated. For example, a portion where an abnormal value or an inflection point exists in a surface of the wafer can be accurately comprehended by evaluating the entire surface of the wafer with showing it as a map.

The invention claimed is:

1. A method of evaluating a shape of a semiconductor wafer comprising the steps of:
    measuring shape data of a semiconductor wafer by scanning a front surface and/or a back surface of the semiconductor wafer;
    calculating a differential profile through a differential process of the measured shape data;
    analyzing the obtained differential profile and obtaining a surface characteristic of the wafer to quantify a shape of the wafer;
    evaluating a shape of the semiconductor wafer, wherein the shape data of the semiconductor wafer displacement data of a plane of the semiconductor wafer and/or thickness data of the semiconductor wafer; and
    the displacement data of the plane of the semiconductor wafer are displacement of a plane in a direction of thickness in the front surface or the back surface of the wafer when the semiconductor wafer is placed without suction; or
    the thickness data of the semiconductor wafer are displacement of a plane in a direction of thickness in one main surface of the wafer when an entire of another main surface of the semiconductor wafer is sucked; or
    the displacement data of the plane of the semiconductor wafer are displacement of planes in a direction of thickness in the front surface and the back surface of the wafer when a part of the semiconductor wafer is sucked with a wafer holder, and the thickness data of the semiconductor wafer are difference of the displacement data of planes in the front surface and the back surface of the wafer when a part of the semiconductor wafer is sucked.

2. The method of evaluating a shape of a semiconductor wafer according to claim 1, wherein the surface characteristic of the semiconductor wafer is obtained at least in the peripheral portion of the semiconductor wafer.

3. The method of evaluating a shape of a semiconductor wafer according to claim 2, wherein the shape data of the semiconductor wafer are measured by scanning the front surface and/or the back surface of the semiconductor wafer at an interval of 1 mm or less.

4. The method of evaluating a shape of a semiconductor wafer according to claim 3, wherein the differential process of the measured shape data is performed by, at first, drawing a shape profile along a radial direction from the measured shape data, and calculating a differential profile through differentiation of the shape profile at a constant interval with setting an arbitrary point as a reference.

5. The method of evaluating a shape of a semiconductor wafer according to claim 4, wherein a second differential profile is used as the differential profile, which is calculated by differentiating the shape profile at a constant interval with setting an arbitrary point as a reference to calculate a first differential profile, and subsequently further differentiating the first differential profile at a constant interval.

6. The method of evaluating a shape of a semiconductor wafer according to claim 5, wherein the shape profile is differentiated at an interval of 1 mm.

7. The method of evaluating a shape of semiconductor wafer according to claim 6, wherein the first differential profile is differentiated at an interval of 1 mm.

8. The method of evaluating a shape of a semiconductor wafer according to claim 7, a wherein removal of components with long wavelengths and/or measured noise is conducted when calculating the differential profile.

9. The method of evaluating a shape of a semiconductor wafer according to claim 8, wherein the removal of components with long wavelengths is conducted by means of least squares approximation or high-pass filter.

10. The method of evaluating a shape of a semiconductor wafer according to claim 9, wherein the surface characteristic of the semiconductor wafer is obtained by setting a most peripheral point of the calculated differential profile as a most peripheral data point A1, scanning the differential profile from the most peripheral data point A1 to a center of the wafer and detecting a point where zero is firstly obtained as a Roll Off starting point B1, and performing analysis with setting the Roll Off starting point B1 as a reference.

11. The method of evaluating a shape of a semiconductor wafer according to claim 10, wherein the surface characteristic of the semiconductor wafer is obtained by setting a most peripheral point of the calculated differential profile as a point of the calculated differential profile as a most peripheral data point A1, scanning the differential profile from the most peripheral data point A1 to a center of the wafer and detecting a position where a maximum value is obtained as a Flip Up maximum slope position C1, and performing analysis with setting the Flip Up maximum slope position C1 as a reference.

12. The method of evaluating a shape of a semiconductor wafer according to claim 11, wherein the surface characteristic of the semiconductor wafer is obtained by scanning the differential profile from the calculated Flip Up maximum slope position C1 to a center of the wafer and detecting a position where zero is firstly obtained as a Flip Up starting point D1, and performing analysis with setting the Flip Up starting point D1 as a reference.

13. The method of evaluating a shape of a semiconductor wafer according to claim 12, wherein the surface characteristic of the semiconductor wafer is obtained by setting a most peripheral point of the second differential profile calculated as the differential profile as a most peripheral data point A2, scanning the second differential profile from the most peripheral data point A2 to a center of the wafer and detecting a position where zero is firstly obtained as a Flip Up maximum slope position C2, and performing analysis with setting the Flip Up maximum slope position C2 as a reference.

14. The method of evaluating a shape of a semiconductor wafer according to claim 13, wherein a threshold is set to the differential profile, and a locally abnormal value of the shape of the wafer is detected.

15. The method of evaluating a shape of a semiconductor wafer according to claim 14, wherein the threshold is set at ±0.01 µm/mm.

16. The method of evaluating a shape of a semiconductor wafer according to claim 15, wherein the surface characteristic of the semiconductor wafer obtained along the radial direction is calculated all round the wafer.

17. The method of evaluating a shape of a semiconductor wafer according to claim 16, wherein the surface characteristic all round the semiconductor wafer is obtained at an interval of a central angle of the wafer of 1° or less.

18. The method of evaluating a shape of a semiconductor wafer according to claim 8, wherein the removal of the measured noise is performed by means of moving average or low-pass filter.

19. The method of evaluating a shape of a semiconductor wafer according to claim 18, wherein the surface characteristic of the semiconductor wafer is obtained by setting a most peripheral point of the calculated differential profile as a most peripheral data point A1, scanning the differential profile from the most peripheral data point A1 to a center of the wafer and detecting a point where zero is firstly obtained as a Roll Off starting point B1, and performing analysis with setting the Roll Off starting point B1 as a reference.

20. The method of evaluating a shape of a semiconductor wafer according to claim 19, wherein the surface characteristic of the semiconductor wafer is obtained by setting a most peripheral point of the calculated differential profile as a most peripheral data point A1, scanning the differential profile from the most peripheral data point A1 to a center of the wafer and detecting a position where a maximum value is obtained as a Flip Up maximum slope position C1, and performing analysis with setting the Flip Up maximum slope position C1 as a reference.

21. The method of evaluating a shape of a semiconductor wafer according to claim 20, wherein the surface characteristic of the semiconductor wafer is obtained by scanning the differential profile from the calculated Flip Up maximum slope position C1 to a center of the wafer and detecting a position where zero is firstly obtained as a Flip Up starting point D1, and performing analysis with setting the Flip Up starting point D1 as a reference.

22. The method of evaluating a shape of a semiconductor wafer according to claim 21, wherein the surface characteristic of the semiconductor wafer is obtained by setting a most peripheral point of the second differential profile calculated as the differential profile as a most peripheral data point A2, scanning the second differential profile from the most peripheral data point A2 to a center of the wafer and detecting a position where zero is firstly obtained as a Flip Up maximum slope position C2, and performing analysis with setting the Flip Up maximum slope position C2 as a reference.

23. The method of evaluating a shape of a semiconductor wafer according to claim 22, wherein a threshold is set to the differential profile, and a locally abnormal value of the shape of the wafer is detected.

24. The method of evaluating a shape of a semiconductor wafer according to claim 23, wherein the threshold is set at ±0.01 µm/mm.

25. The method of evaluating a shape of a semiconductor wafer according to claim 24, wherein the surface characteristic of the semiconductor wafer obtained along the radial direction is calculated all round the wafer.

26. The method of evaluating a shape of a semiconductor wafer according to claim 25, wherein the surface characteristic all round the semiconductor wafer is obtained at an interval of a central angle of the wafer of 1° or less.

27. The method of evaluating a shape of a semiconductor wafer according to claim 2, wherein the differential process of the measured shape data is performed by, at first, drawing a shape profile along a radial direction from the measured shape data, and calculating a differential profile through differentiation of the shape profile at a constant interval with setting an arbitrary point as a reference.

28. The method of evaluating a shape of semiconductor wafer according to claim 27, wherein a second differential profile is used as the differential profile, which is calculated by differentiating the shape profile at a constant interval with setting an arbitrary point as a reference to calculate a first differential profile, and subsequently further differentiating the first differential profile at a constant interval.

29. The method of evaluating a shape of a semiconductor wafer according to claim 28, wherein the shape profile is differentiated at an interval of 1 mm.

30. The method of evaluating a shape of a semiconductor wafer according to claim 29, wherein the first differential profile is differentiated at an interval of 1 mm.

31. The method of evaluating a shape of a semiconductor wafer according to claim 30, wherein removal of components with long wavelengths and/or measured noise is conducted when calculating the differential profile.

32. The method of evaluating a shape of a semiconductor wafer according to claim 31, wherein the removal of components with long wavelengths is conducted by means of least squares approximation or high-pass filter.

33. The method of evaluating a shape of a semiconductor wafer according to claim 32, wherein the surface characteristic of the semiconductor wafer is obtained by setting a most peripheral point of the calculated differential profile as a most peripheral data point A1, scanning the differential profile from the most peripheral data point A1 to a center of the wafer and detecting a point where zero is firstly obtained as a Roll Off starting point B1, and performing analysis with setting the Roll Off starting point B1 as a reference.

34. The method of evaluating a shape of a semiconductor wafer according to claim 33, wherein the surface characteristic of the semiconductor point of the calculated differential profile as a most peripheral data point A1, scanning the differential profile from the most peripheral data point A1 to a center of the wafer and detecting a position where a maximum value is obtained as a Flip Up maximum slope position C1, and performing analysis with setting the Flip Up maximum slope position C1 as a reference.

35. The method of evaluating a shape of a semiconductor wafer according to claim 34, wherein the surface characteristic of the semiconductor wafer is obtained by scanning the differential profile from the calculated Flip Up maximum slope position C1 to a center of the wafer and detecting a position where zero is firstly obtained as a Flip Up starting point D1, and performing analysis with setting the Flip Up starting point D1 as a reference.

36. The method of evaluating a shape of a semiconductor wafer according to claim 35, wherein the surface characteristic of the semiconductor wafer is obtained by setting a most peripheral point of the second differential profile calculated as the differential profile as a most peripheral data point A2, scanning the second differential profile from the most peripheral data point A2 to a center of the wafer and detecting a position where zero is firstly obtained as a Flip Up maximum slope position C2, and performing analysis with setting the Flip Up maximum slope position C2 as a reference.

37. The method of evaluating a shape of a semiconductor wafer according to claim 36, wherein a threshold is set to the differential profile, and a locally abnormal value of the shape of the wafer is detected.

38. The method of evaluating a shape of a semiconductor wafer according to claim 37, wherein the threshold is set at ±0.01 μm/mm.

39. The method of evaluating a shape of a semiconductor wafer according to claim 38, wherein the surface characteristic of the semiconductor wafer obtained along the radial direction is calculated all round the wafer.

40. The method of evaluating a shape of a semiconductor wafer according to claim 39, wherein the surface characteristic all round the semiconductor wafer is obtained at an interval of a central angle of the wafer of 1° or less.

41. The method of evaluating a shape of a semiconductor wafer according to claim 31, wherein the removal of the measured noise is performed by means of moving average or low-pass filter.

42. The method of evaluating a shape of a semiconductor wafer according to claim 41, wherein the surface characteristic of the semiconductor wafer is obtained by setting a most peripheral point of the calculated differential profile as a most peripheral data point A1, scanning the differential profile from the most peripheral data point A1 to a center of the wafer and detecting a point where zero is firstly obtained as a Roll Off starting point B1, and performing analysis with setting the Roll Off starting point B1 as a reference.

43. The method of evaluating a shape of a semiconductor wafer according to claim 42, wherein the surface characteristic of the semiconductor wafer is obtained by setting a most peripheral point of the calculated differential profile as a most peripheral data point A1, scanning the differential profile from the most peripheral data point A1 to a center of the wafer and detecting a position where a maximum value is obtained as a Flip Up maximum slope position C1, and performing analysis with setting the Flip Up maximum slope position C1 as a reference.

44. The method of evaluating a shape of a semiconductor wafer according to claim 43, wherein the surface characteristic of the semiconductor wafer is obtained by scanning the differential profile from the calculated Flip Up maximum slope position C1 to a center of the wafer and detecting a position where zero is firstly obtained as a Flip Up starting point D1, and performing analysis with setting the Flip Up starting point D1 as a reference.

45. The method of evaluating a shape of a semiconductor wafer according to claim 44, wherein the surface characteristic of the semiconductor wafer is obtained by setting a most peripheral point of the second differential profile calculated as the differential profile as a most peripheral data point A2, scanning the second differential profile from the most peripheral data point A2 to a center of the wafer and detecting a position where zero is firstly obtained as a Flip Up maximum slope position C2, and performing analysis with setting the Flip Up maximum slope position C2 as a reference.

46. The method of evaluating a shape of a semiconductor wafer according to claim 45, wherein a threshold is set to the differential profile, and a locally abnormal value of the shape of the wafer is detected.

47. The method of evaluating a shape of a semiconductor wafer according to claim 46, wherein the threshold is set at ±0.01 μm/mm.

48. The method of evaluating a shape of a semiconductor wafer according to claim 47, wherein the surface characteristic of the semiconductor wafer obtained along the radial direction is calculated all round the wafer.

49. The method of evaluating a shape of a semiconductor wafer according to claim 48, wherein the surface characteristic all round the semiconductor wafer is obtained at an interval of a central angle of the wafer of 1° or less.

50. The method of evaluating a shape of a semiconductor wafer according to claim 1, wherein the shape data of the semiconductor wafer are measured by scanning the front surface and/or the back surface of the semiconductor wafer at an interval of 1 mm or less.

51. The method of evaluating a shape of a semiconductor wafer according to claim 50, wherein the differential process of the measured shape data is performed by, at first, drawing a shape profile along a radial direction from the measured shape data, and calculating a differential profile through differentiation of the shape profile at a constant interval with setting an arbitrary point as a reference.

52. The method of evaluating a shape of semiconductor wafer according to claim 51, wherein a second differential profile is used as the differential profile, which is calculated by differentiating the shape profile at a constant interval with setting an arbitrary point as a reference to calculate a first differential profile, and subsequently further differentiating the first differential profile at a constant interval.

53. The method of evaluating a shape of a semiconductor wafer according to claim 52, wherein the shape profile is differentiated at an interval of 1 mm.

54. The method of evaluating a shape of a semiconductor wafer according to claim 53, wherein the first differential profile is differentiated at an interval of 1 mm.

55. The method of evaluating a shape of a semiconductor wafer according to claim 54, wherein removal of components with long wavelengths and/or measured noise is conducted when calculating the differential profile.

56. The method of evaluating a shape of a semiconductor wafer according to claim 55, wherein the removal of components with long wavelengths is conducted by means of least squares approximation or high-pass filter.

57. The method of evaluating a shape of a semiconductor wafer according to claim 56, wherein the surface characteristic of the semiconductor wafer is obtained by setting a most peripheral point of the calculated differential profile as a most peripheral data point A1, scanning the differential profile from the most peripheral data point A1 to a center of the wafer and detecting a point where zero is firstly obtained as a Roll Off starting point B1, and performing analysis with setting the Roll Off starting point B1 as a reference.

58. The method of evaluating a shape of a semiconductor wafer according to claim 57, wherein the surface characteristic of the semiconductor wafer is obtained by setting a most peripheral point of the calculated differential profile as a most peripheral data point A1, scanning the differential profile from the most peripheral data point A1 to a center of the wafer and detecting a position where a maximum value is obtained as a Flip Up maximum slope position C1, and performing analysis with setting the Flip Up maximum slope position C1 as a reference.

59. The method of evaluating a shape of a semiconductor wafer according to claim 58, wherein the surface characteristic of the semiconductor wafer is obtained by scanning the differential profile from the calculated Flip Up maximum slope position C1 to a center of the wafer and detecting a position where zero is firstly obtained as a Flip Up starting point D1, and performing analysis with setting the Flip Up starting point D1 as a reference.

60. The method of evaluating a shape of a semiconductor wafer according to claim 59, wherein the surface characteristic of the semiconductor wafer is obtained by setting a most peripheral point of the second differential profile calculated as the differential profile as a most peripheral data point A2, scanning the second differential profile from the most peripheral data point A2 to a center of the wafer and detecting a position where zero is firstly obtained as a Flip Up maximum slope position C2, and performing analysis with setting the Flip Up maximum slope position C2 as a reference.

61. The method of evaluating a shape of a semiconductor wafer according to claim 60, wherein a threshold is set to the differential profile, and a locally abnormal value of the shape of the wafer is detected.

62. The method of evaluating a shape of a semiconductor wafer according to claim 61, wherein the threshold is set at ±0.01 µm/mm.

63. The method of evaluating a shape of a semiconductor wafer according to claim 62, wherein the surface characteristic of the semiconductor wafer obtained along the radial direction is calculated all round the wafer.

64. The method of evaluating a shape of a semiconductor wafer according to claim 63, wherein the surface characteristic all round the semiconductor wafer is obtained at an interval of a central angle of the wafer of 1° or less.

65. The method of evaluating a shape of a semiconductor wafer according to claim 55, wherein the removal of the measured noise is performed by means of moving average or low-pass filter.

66. The method of evaluating a shape of a semiconductor wafer according to claim 65, wherein the surface characteristic of the semiconductor wafer is obtained by setting a most peripheral point of the calculated differential profile as a most peripheral data point A1, scanning the differential profile from the most peripheral data point A1 to a center of the wafer and detecting a point where zero is firstly obtained as a Roll Off starting point B1, and performing analysis with setting the Roll Off starting point B1 as a reference.

67. The method of evaluating a shape of a semiconductor wafer according to claim 66, wherein the surface characteristic of the semiconductor wafer is obtained by setting a most peripheral point of the calculated differential profile as a most peripheral data point A1, scanning the differential profile from the most peripheral data point A1 to a center of the wafer and detecting a position where a maximum value is obtained as a Flip Up maximum slope potion C1, and performing analysis with setting the Flip Up maximum slope position C1 as a reference.

68. The method of evaluating a shape of a semiconductor wafer according to claim 67, wherein the surface characteristic of the semiconductor wafer is obtained by scanning the differential profile from the calculated Flip Up maximum slope position C1 to a center of the wafer and detecting a position where zero is firstly obtained as a Flip Up starting point D1, and performing analysis with setting the Flip Up starting point D1 as a reference.

69. The method of evaluating a shape of a semiconductor wafer according to claim 68, wherein the surface characteristic of the semiconductor wafer is obtained by setting a most peripheral point of the second differential profile calculated as the differential profile as a most peripheral data point A2, scanning the second differential profile from the most peripheral data point A2 to a center of the wafer and detecting a position where zero is firstly obtained as a Flip Up maximum slope position C2, and performing analysis with setting the Flip Up maximum slope position C2 as a reference.

70. The method of evaluating a shape of a semiconductor wafer according to claim 69, wherein a threshold is set to the differential profile, and a locally abnormal value of the shape of the wafer is detected.

71. The method of evaluating a shape of a semiconductor wafer according to claim 70, wherein the threshold is set at ±0.01 µm/mm.

72. The method of evaluating a shape of a semiconductor wafer according to claim 71, wherein the surface characteristic of the semiconductor wafer obtained along the radial direction is calculated all round the wafer.

73. The method of evaluating a shape of a semiconductor wafer according to claim 72, wherein the surface characteristic all round the semiconductor wafer is obtained at an interval of a central angle of the wafer of 1° or less.

74. The method of evaluating a shape of a semiconductor wafer according to claim 1, wherein the differential process of the measured shape data is performed by, at first, drawing a shape profile along a radial direction from the measured shape data, and calculating a differential profile through differentiation of the shape profile at a constant interval with setting an arbitrary point as a reference.

75. The method of evaluating a shape of a semiconductor wafer according to claim 74, wherein a second differential profile is used as the differential profile, which is calculated by differentiating the shape profile at a constant interval with setting an arbitrary point as a reference to calculate a first differential profile, and subsequently further differentiating the first differential profile at a constant interval.

76. The method of evaluating a shape of a semiconductor wafer according to claim 75, wherein the first differential profile is differentiated at an interval of 1 mm.

77. The method of evaluating a shape of a semiconductor wafer according to claim 75, wherein the surface characteristic of the semiconductor wafer is obtained by setting a most peripheral point of the second differential profile calculated as the differential profile as a most peripheral data point A2, scanning the second differential profile from the most peripheral data point A2 to a center of the wafer and detecting a position where zero is firstly obtained as a Flip Up maximum slope position C2, and performing analysis with setting the Flip Up maximum slope position C2 as a reference.

78. The method of evaluating a shape of a semiconductor wafer according to claim 74, wherein the shape profile is differentiated at an interval of 1 mm.

79. The method of evaluating a shape of a semiconductor wafer according to claim 74, wherein removal of components with long wavelengths and/or measured noise is conducted when calculating the differential profile.

80. The method of evaluating a shape of semiconductor wafer according to claim 79, wherein the removal of components with long wavelengths is conducted by means of least squares approximation or high-pass filter.

81. The method of evaluating a shape of a semiconductor wafer according to claim 79, wherein the removal of the measured noise is performed by means of moving average or low-pass filter.

82. The method of evaluating a shape of a semiconductor wafer according to claim 74, wherein the surface characteristic of the semiconductor wafer obtained along the radial direction is calculated all round the wafer.

83. The method of evaluating a shape of a semiconductor wafer according to claim 82, wherein the surface characteristic all round the semiconductor wafer is obtained at an interval of a central angle of the wafer of 1° or less.

84. The method of evaluating a shape of a semiconductor wafer according to claim 1, wherein the surface characteristic of the semiconductor wafer is obtained by setting a most peripheral point of the calculated differential profile as a most peripheral data point A1, scanning the differential profile from the most peripheral data point A1 to a center of the wafer and detecting a point where zero is firstly obtained as a Roll Off starting point B1, and performing analysis with setting the Roll Off starting point B1 as a reference.

85. The method of evaluating a shape of a semiconductor wafer according to claim 1, wherein the surface characteristic of the semiconductor wafer is obtained by setting a most peripheral point of the calculated differential profile as a most peripheral data point A1, scanning the differential profile from the most peripheral data point A1 to a center of the wafer and detecting a position where a maximum value is obtained as a Flip Up maximum slope position C1, and performing analysis with setting the Flip Up maximum slope position C1 as a reference.

86. The method of evaluating a shape of a semiconductor wafer according to claim 85, wherein the surface characteristic of the semiconductor wafer is obtained by scanning the differential profile from the calculated Flip Up maximum slope position C1 to a center of the wafer and detecting a position where zero is firstly obtained as a Flip Up starting point D1, and performing analysis with setting the Flip Up starting point D1 as a reference.

87. The method of evaluating a shape of a semiconductor wafer according to claim 1, wherein a threshold is set to the differential profile, and a locally abnormal value of the shape of the wafer is detected.

88. The method of evaluating a shape of a semiconductor wafer according to claim 87, wherein the threshold is set at ±0.01 μm/mm.

89. An apparatus for evaluating a shape of a semiconductor wafer, comprising at least:
  a shape measuring means for measuring shape data of a semiconductor wafer;
  a memorizing means for storing the measured shape data;
  a differential processing means for differentiating the stored shape data and calculating a differential profile, and;
  a surface characteristic calculating means for obtaining a surface characteristic of the wafer by analyzing the calculated differential profile, wherein the shape measuring means is a means such that displacement data of a plane are obtained as the shape data by measuring displacement of a plane in a direction of thickness in a front surface or a back surface of the semiconductor wafer placed without suction, or wherein the shape measuring means is a means such that thickness data are obtained as the shape data by measuring displacement of a plane in a direction of thickness in one main surface of the semiconductor wafer of which an entire of another main surface is sucked, or wherein the shape measuring means is a means such that, as the shape data, displacement data of a plane are obtained by measuring displacement of planes in a direction of thickness in a front surface and a back surface of the semiconductor wafer of which a part is sucked by a wafer holder, and thickness data are obtained by measuring difference of the obtained displacement data of the planes in the front surface and the back surface of the wafer.

90. The apparatus for evaluating a shape of a semiconductor wafer according to claim 89, wherein the differential processing means is a means such that a shape profile along a radial direction is drawn from the shape data, and the differential profile is calculated through differentiation of the shape profile at a constant interval with setting an arbitrary position as a reference.

91. The apparatus for evaluating a shape of a semiconductor wafer according to claim 90, wherein the differential processing means is a means such that a first differential profile is calculated through differentiation of the shape profile at a constant interval with setting an arbitrary position as a reference, and subsequently a second differential profile is calculated through further differentiation of the first differential profile at a constant interval.

92. The apparatus for evaluating a shape of a semiconductor wafer according to claim 90, wherein the differential processing means is a means such that removal of components with long wavelengths and/or measured noise is conducted.

93. The apparatus for evaluating a shape of a semiconductor wafer according to claim 92, wherein the surface characteristic calculating means is a means such that a most peripheral point of the differential profile is set as a most peripheral data point A1, the differential profile is scanned from the most peripheral data point A1 to a center of the wafer, a point where zero is firstly obtained is detected as a Roll Off starting point B1, analysis is performed with setting the Roll Off starting point B1 as a reference, and the surface characteristic of the wafer is obtained.

94. The apparatus for evaluating a shape of a semiconductor wafer according to claim 93, wherein the surface characteristic calculating means is a means such that a most peripheral point of the differential profile is set as a most peripheral data point A1, the differential profile is scanned from the most peripheral data point A1 to a center of the wafer, a point where the maximum value is obtained is detected as a Flip Up maximum slope position C1, analysis is performed with setting the Flip Up maximum slope position C1 as a reference, and the surface characteristic of the wafer is obtained.

95. The apparatus for evaluating a shape of a semiconductor wafer according to claim 94, wherein the surface characteristic calculating means is a means such that the differential profile is scanned from the calculated Flip Up maximum slope position C1 to a center of the wafer, a position where zero is firstly obtained is detected as a Flip Up starting point D1, analysis is performed with setting the Flip Up starting point D1 as a reference, and the surface characteristic of the wafer is obtained.

96. The apparatus for evaluating a shape of a semiconductor wafer according to claim 95, wherein the surface characteristic calculating means is a means such that a most peripheral point of the second differential profile calculated as the differential profile is set as a most peripheral data point A2, the second differential profile is scanned from the most peripheral data point A2 to a center of the wafer, a position where zero is firstly obtained is detected as a Flip Up maximum slope position C2, analysis is performed with setting the Flip Up maximum slope position C2 as a reference, and the surface characteristic of the wafer is obtained.

97. The apparatus for evaluating a shape of a semiconductor wafer according to claim 96, wherein the surface characteristic calculating means is a means such that a threshold is set to the differential profile, and a locally abnormal value of the shape of the wafer is detected.

98. The apparatus for evaluating a shape of a semiconductor wafer according to claim 91, wherein the differential processing means is a means such that removal of components with long wavelengths and/or measured noise is conducted.

99. The apparatus for evaluating a shape of a semiconductor wafer according to claim 98, wherein the surface characteristic calculating means is a means such that a most peripheral point of the differential profile is set as a most peripheral data point A1, the differential profile is scanned from the most peripheral data point A1 to a center of the wafer, a point where zero is firstly obtained is detected as a Roll Off starting point B1, analysis is performed with setting the Roll Off starting point B1 as a reference, and the surface characteristic of the wafer is obtained.

100. The apparatus for evaluating a shape of a semiconductor wafer according to claim 99, wherein the surface characteristic calculating means is a means such that a most peripheral point of the differential profile is set as a most peripheral data point A1, the differential profile is scanned from the most peripheral data point A1 to a center of the wafer, a point where the maximum value is obtained is detected as a Flip Up maximum slope position C1, analysis is performed with setting the Flip Up maximum slope position C1 as a reference, and the surface characteristic of the wafer is obtained.

101. The apparatus for evaluating a shape of a semiconductor wafer according to claim 100, wherein the surface characteristic calculating means is a means such that the differential profile is scanned from the calculated Flip Up maximum slope position C1 to a center of the wafer, a position where zero is firstly obtained is detected as a Flip Up starting point D1, analysis is performed with setting the Flip Up starting point D1 as a reference, and the surface characteristic of the wafer is obtained.

102. The apparatus for evaluating a shape of a semiconductor wafer according to claim 101, wherein the surface characteristic calculating means is a means such that a most peripheral point of the second differential profile calculated as the differential profile is set as a most peripheral data point A2, the second differential profile is scanned from the most peripheral data point A2 to a center of the wafer, a position where zero is firstly obtained is detected as a Flip Up maximum slope position C2, analysis is performed with setting the Flip Up maximum slope position C2 as a reference, and the surface characteristic of the wafer is obtained.

103. The apparatus for evaluating a shape of a semiconductor wafer according to claim 102, wherein the surface characteristic calculating means is a means such that a threshold is set to the differential profile, and a locally abnormal value of the shape of the wafer is detected.

104. The apparatus for evaluating a shape of a semiconductor wafer according to claim 91, wherein the surface characteristic calculating means is a means such that a most peripheral point of the second differential profile calculated as the differential profile is set as a most peripheral data point A2, the second differential profile is scanned from the most peripheral data point A2 to a center of the wafer, a position where zero is firstly obtained is detected as a Flip Up maximum slope position C2, analysis is performed with setting the Flip Up maximum slope a position C2 as a reference, and the surface characteristic of the wafer is obtained.

105. The apparatus for evaluating a shape of a semiconductor wafer according to claim 89, wherein the differential processing means is a means such that removal of components with long wavelengths and/or measured noise is conducted.

106. The apparatus for evaluating a shape of a semiconductor wafer according to claim 89, wherein the surface characteristic calculating means is a means such that a most peripheral point of the differential profile is set as a most peripheral data point A1, the differential profile is scanned from the most peripheral data point A1 to a center of the wafer, a point where zero is firstly obtained is detected as a Roll Off starting point B1, analysis is performed with setting the Roll Off starting point B1 as a reference, and the surface characteristic of the wafer is obtained.

107. The apparatus for evaluating a shape of a semiconductor wafer according to claim 89, wherein the surface characteristic calculating means is a means such that a most peripheral point of the differential profile is set as a most peripheral data point A1, the differential profile is scanned from the most peripheral data point A1 to a center of the wafer, a point where the maximum value is obtained is detected as a Flip Up maximum slope position C1, analysis is performed with setting the Flip Up maximum slope position C1 as a reference, and the surface characteristic of the wafer is obtained.

108. The apparatus for evaluating a shape of a semiconductor wafer according to claim 107, wherein the surface characteristic calculating means is a means such that the differential profile is scanned from the calculated Flip Up maximum slope position C1 to a center of the wafer, a position where zero is firstly obtained is detected as a Flip Up starting point D1, analysis is performed with setting the Flip Up starting point D1 as a reference, and the surface characteristic of the wafer is obtained.

109. The apparatus for evaluating a shape of a semiconductor wafer according to claim 89, wherein the surface characteristic calculating means is a means such that a threshold is set to the differential profile, and a locally abnormal value of the shape of the wafer is detected.

* * * * *